United States Patent
Akkarakaran et al.

(10) Patent No.: US 12,225,606 B2
(45) Date of Patent: Feb. 11, 2025

(54) INTEGRATED ACCESS AND BACKHAUL SIDELINK FUNCTION CONTROL

(71) Applicant: QUALCOMM Incorporated, San Diego, CA (US)

(72) Inventors: Sony Akkarakaran, Poway, CA (US); Navid Abedini, Basking Ridge, NJ (US); Tao Luo, San Diego, CA (US); Junyi Li, Fairless Hills, PA (US); Naeem Akl, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 699 days.

(21) Appl. No.: 17/385,181

(22) Filed: Jul. 26, 2021

(65) Prior Publication Data

US 2023/0025046 A1    Jan. 26, 2023

(51) Int. Cl.
*H04W 76/14* (2018.01)
*H04W 88/12* (2009.01)

(52) U.S. Cl.
CPC ............ *H04W 76/14* (2018.02); *H04W 88/12* (2013.01)

(58) Field of Classification Search
CPC ......................... H04B 7/15542; H04W 56/002; H04W 72/25; H04W 76/14; H04W 8/005; H04W 88/04; H04W 88/12; H04W 92/18
See application file for complete search history.

(56) References Cited

U.S. PATENT DOCUMENTS

| | | | | |
|---|---|---|---|---|
| 2023/0171714 A1* | 6/2023 | Oh | ......................... | H04W 40/18 370/330 |
| 2023/0247504 A1* | 8/2023 | Haustein | ................ | H04W 36/24 455/436 |
| 2023/0276313 A1* | 8/2023 | Wu | .................... | H04W 36/0055 370/331 |
| 2023/0308853 A1* | 8/2023 | Ding | ....................... | H04W 4/40 |
| 2023/0318690 A1* | 10/2023 | Kurras | .................... | H04B 7/086 375/262 |
| 2023/0379792 A1* | 11/2023 | Muhammad | ...... | H04W 28/0289 |

\* cited by examiner

*Primary Examiner* — Awet Haile

(57) ABSTRACT

Methods, systems, and devices for wireless communications are described. A base station (e.g., a central unit (CU) function of the base station) may select, from a set of distributed units (DUs) associated with the CU, a DU of an integrated access and backhaul (IAB) node to control sidelink communications for a user equipment (UE). The base station may determine a configuration of sidelink parameters for the sidelink communications with the UE, the sidelink parameters comprising an identification of the selected DU. The base station may transmit, to the TAB node performing sidelink communications with the UE, an indication of the configuration of sidelink parameters for the sidelink communications.

27 Claims, 16 Drawing Sheets

INTEGRATED ACCESS AND BACKHAUL SIDELINK FUNCTION CONTROL

FIELD OF TECHNOLOGY

The following relates to wireless communications, including integrated access and backhaul sidelink function control.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems (e.g., 5G new radio (NR) systems), infrastructure and spectral resources for NR access may additionally support wireless backhaul link capabilities in supplement to wireline backhaul connections, providing an integrated access and backhaul (IAB) network architecture. One or more base stations may include central units (CUs) and distributed units (DUs) and may be referred to as donor base stations. One or more DUs associated with a donor base station may be partially controlled by CUs associated with the donor base station. The one or more donor base stations (e.g., IAB donors) may be in communication with one or more additional base stations (e.g., IAB nodes) via supported access and backhaul links. IAB nodes may support mobile terminal (MT) functionality controlled and/or scheduled by DUs of a coupled IAB donor. In addition, the IAB nodes may include DUs that support communication links with additional entities (e.g., IAB nodes, UEs, etc.) within the relay chain or configuration of the access network (e.g., downstream). In some examples, the IAB of the IAB network may serve UEs that support sidelink communications.

SUMMARY

The described techniques relate to improved methods, systems, devices, and apparatuses that support integrated access and backhaul sidelink function control. Generally, the described techniques provide for improved control of sidelink communications between user equipment (UE) associated with an integrated access and backhaul (IAB) node of an IAB network. For example, a central unit (CU) associated with a base station may identify or otherwise select a distributed unit (DU) of an IAB node to control or otherwise manage sidelink communications with the UE. The CU may determine a configuration of sidelink parameters for the sidelink communications, which may include at least the identification information for the selected DU. The CU may transmit the indication of the configuration to the IAB node to identify which DU the UE is to use, at least to some degree, for the sidelink communications. The DU of the IAB node connected to the UE may identify the configuration for the sidelink parameters (e.g., which DU is the selected DU) and then provide an indication of the selected DU to the UE. The UE may identify or otherwise determine which DU is the selected DU and then use that DU, at to some degree, to control the sidelink communications. For example, the UE may use the selected DU for timing synchronization.

A method for wireless communication at a CU is described. The method may include selecting, from a set of DUs associated with the CU, a DU of an IAB node to control sidelink communications for a UE, determining a configuration of sidelink parameters for the sidelink communications with the UE, the sidelink parameters including an identification of the selected DU, and transmitting, to the IAB node performing sidelink communications with the UE, an indication of the configuration of sidelink parameters for the sidelink communications.

An apparatus for wireless communication at a CU is described. The apparatus may include a processor, memory coupled with the processor, and instructions stored in the memory. The instructions may be executable by the processor to cause the apparatus to select, from a set of DUs associated with the CU, a DU of an IAB node to control sidelink communications for a UE, determine a configuration of sidelink parameters for the sidelink communications with the UE, the sidelink parameters including an identification of the selected DU, and transmit, to the IAB node performing sidelink communications with the UE, an indication of the configuration of sidelink parameters for the sidelink communications.

Another apparatus for wireless communication at a CU is described. The apparatus may include means for selecting, from a set of DUs associated with the CU, a DU of an IAB node to control sidelink communications for a UE, means for determining a configuration of sidelink parameters for the sidelink communications with the UE, the sidelink parameters including an identification of the selected DU, and means for transmitting, to the IAB node performing sidelink communications with the UE, an indication of the configuration of sidelink parameters for the sidelink communications.

A non-transitory computer-readable medium storing code for wireless communication at a CU is described. The code may include instructions executable by a processor to select, from a set of DUs associated with the CU, a DU of an IAB node to control sidelink communications for a UE, determine a configuration of sidelink parameters for the sidelink communications with the UE, the sidelink parameters including an identification of the selected DU, and transmit, to the IAB node performing sidelink communications with the UE, an indication of the configuration of sidelink parameters for the sidelink communications.

In some examples of the method, apparatuses, and non-transitory computer-readable medium described herein, selecting the DU may include operations, features, means, or instructions for selecting the DU of the IAB node having a sidelink connection with the UE based on the DU being collocated within the IAB node having the sidelink connection with the UE.

Some examples of the method, apparatuses, and non-transitory computer-readable medium described herein may further include operations, features, means, or instructions for determining that a first synchronization signal transmitted from the selected DU may be quasi-collocated with respect to a second synchronization signal transmitted from the DU performing sidelink communications with the UE, where the selecting may be based on the quasi-collocated first synchronization signal and second synchronization signal.

Some examples of the method, apparatuses, and non-transitory computer-readable medium described herein may further include operations, features, means, or instructions for exchanging one or more configuration messages with the DU performing sidelink communications with the UE, the parent DU of the DU performing sidelink communications with the UE, or both, where the configuration of sidelink parameters may be based on the exchanging.

Some examples of the method, apparatuses, and non-transitory computer-readable medium described herein may further include operations, features, means, or instructions for identifying a type of sidelink communications, a set of sidelink resources associated with the sidelink communications, or both, where the selecting may be based on the identifying.

In some examples of the method, apparatuses, and non-transitory computer-readable medium described herein, the indication may be transmitted via a radio resource control (RRC) message, an F1 interface message, medium access control (MAC) control element (CE) message, a downlink control information (DCI) message, a sidelink control information (SCI) message, or a combination thereof.

In some examples of the method, apparatuses, and non-transitory computer-readable medium described herein, the configuration of sidelink parameters includes an indication that the UE may be to perform timing synchronization with the selected DU for the sidelink communications, an indication that the UE may be to receive sidelink grants from the selected DU for the sidelink communications, or both.

In some examples of the method, apparatuses, and non-transitory computer-readable medium described herein, the indication may be transmitted directly to the DU performing sidelink communications with the UE or relayed via one or more parent DUs of the DU performing sidelink communications with the UE.

In some examples of the method, apparatuses, and non-transitory computer-readable medium described herein, the selected DU including the DU of the IAB node having a sidelink connection with the UE or a parent DU of the IAB node.

A method for wireless communication at a DU of an IAB node performing sidelink communications with a UE is described. The method may include identifying a selected DU, the selected DU selected by a CU to control sidelink communications for the UE, determining a configuration of sidelink parameters for the sidelink communications with the UE based on the indication, the sidelink parameters including an identification of the selected DU, and transmitting an indication of the sidelink parameters to the UE.

An apparatus for wireless communication at a DU of an IAB node performing sidelink communications with a UE is described. The apparatus may include a processor, memory coupled with the processor, and instructions stored in the memory. The instructions may be executable by the processor to cause the apparatus to identify a selected DU, the selected DU selected by a CU to control sidelink communications for the UE, determine a configuration of sidelink parameters for the sidelink communications with the UE based on the indication, the sidelink parameters including an identification of the selected DU, and transmit an indication of the sidelink parameters to the UE.

Another apparatus for wireless communication at a DU of an IAB node performing sidelink communications with a UE is described. The apparatus may include means for identifying a selected DU, the selected DU selected by a CU to control sidelink communications for the UE, means for determining a configuration of sidelink parameters for the sidelink communications with the UE based on the indication, the sidelink parameters including an identification of the selected DU, and means for transmitting an indication of the sidelink parameters to the UE.

A non-transitory computer-readable medium storing code for wireless communication at a DU of an IAB node performing sidelink communications with a UE is described. The code may include instructions executable by a processor to identify a selected DU, the selected DU selected by a CU to control sidelink communications for the UE, determine a configuration of sidelink parameters for the sidelink communications with the UE based on the indication, the sidelink parameters including an identification of the selected DU, and transmit an indication of the sidelink parameters to the UE.

Some examples of the method, apparatuses, and non-transitory computer-readable medium described herein may further include operations, features, means, or instructions for determining that the selected DU and the DU performing sidelink communications with the UE may be collocated within the IAB node, where the selected DU may be based on the collocation.

Some examples of the method, apparatuses, and non-transitory computer-readable medium described herein may further include operations, features, means, or instructions for determining that a first synchronization signal transmitted from the selected DU may be quasi-collocated with respect to a second synchronization signal transmitted from the DU performing sidelink communications with the UE, where the selected DU may be based on the quasi-collocated first synchronization signal and second synchronization signal.

Some examples of the method, apparatuses, and non-transitory computer-readable medium described herein may further include operations, features, means, or instructions for exchanging one or more configuration messages with the selected DU, the parent DU of the DU performing sidelink communications with the UE, or both, where the configuration of sidelink parameters may be based on the exchanging.

Some examples of the method, apparatuses, and non-transitory computer-readable medium described herein may further include operations, features, means, or instructions for identifying a type of sidelink communications, a set of sidelink resources associated with the sidelink communications, or both, where the selected DU may be based on the identifying.

In some examples of the method, apparatuses, and non-transitory computer-readable medium described herein, the indication may be received via an RRC message, an F1 interface message, MAC CE message, a DCI message, a SCI message, or a combination thereof.

In some examples of the method, apparatuses, and non-transitory computer-readable medium described herein, the configuration of sidelink parameters includes an indication that the UE may be to perform timing synchronization with the selected DU for the sidelink communications, an indication that the UE may be to receive sidelink grants from the selected DU for the sidelink communications, or both.

In some examples of the method, apparatuses, and non-transitory computer-readable medium described herein, the indication may be received directly to the DU performing sidelink communications with the UE or relayed via one or more parent DUs of the DU performing sidelink communications with the UE.

In some examples of the method, apparatuses, and non-transitory computer-readable medium described herein, the selected DU including the DU of the IAB node performing sidelink communications with the UE or a parent DU of the IAB node.

A method for wireless communication at a UE is described. The method may include receiving, from a DU of an IAB node performing sidelink communications with the UE, a configuration of sidelink parameters for sidelink communications with the DU, identifying a selected DU, the selected DU selected by a CU to control sidelink communications for the UE, and performing sidelink communications based on the selected DU.

An apparatus for wireless communication at a UE is described. The apparatus may include a processor, memory coupled with the processor, and instructions stored in the memory. The instructions may be executable by the processor to cause the apparatus to receive, from a DU of an IAB node performing sidelink communications with the UE, a configuration of sidelink parameters for sidelink communications with the DU, identify a selected DU, the selected DU selected by a CU to control sidelink communications for the UE, and perform sidelink communications based on the selected DU.

Another apparatus for wireless communication at a UE is described. The apparatus may include means for receiving, from a DU of an IAB node performing sidelink communications with the UE, a configuration of sidelink parameters for sidelink communications with the DU, means for identifying a selected DU, the selected DU selected by a CU to control sidelink communications for the UE, and means for performing sidelink communications based on the selected DU.

A non-transitory computer-readable medium storing code for wireless communication at a UE is described. The code may include instructions executable by a processor to receive, from a DU of an IAB node performing sidelink communications with the UE, a configuration of sidelink parameters for sidelink communications with the DU, identify a selected DU, the selected DU selected by a CU to control sidelink communications for the UE, and perform sidelink communications based on the selected DU.

Some examples of the method, apparatuses, and non-transitory computer-readable medium described herein may further include operations, features, means, or instructions for determining that a first synchronization signal transmitted from the selected DU may be quasi-collocated with respect to a second synchronization signal transmitted from the DU performing sidelink communications with the UE, where the selected DU may be based on the quasi-collocated first synchronization signal and second synchronization signal.

Some examples of the method, apparatuses, and non-transitory computer-readable medium described herein may further include operations, features, means, or instructions for exchanging one or more configuration messages with the selected DU, the parent DU of the DU performing sidelink communications with the UE, or both, where the configuration of sidelink parameters may be based on the exchanging.

Some examples of the method, apparatuses, and non-transitory computer-readable medium described herein may further include operations, features, means, or instructions for identifying a type of sidelink communications, a set of sidelink resources associated with the sidelink communications, or both, where the selected DU may be based on the identifying.

In some examples of the method, apparatuses, and non-transitory computer-readable medium described herein, the indication may be received via an RRC message, an F1 interface message, MAC CE message, a DCI message, a SCI message, or combinations thereof.

In some examples of the method, apparatuses, and non-transitory computer-readable medium described herein, the configuration of sidelink parameters includes an indication that the UE may be to perform timing synchronization with the selected DU for the sidelink communications, an indication that the UE may be to receive sidelink grants from the selected DU for the sidelink communications, or both.

In some examples of the method, apparatuses, and non-transitory computer-readable medium described herein, the indication may be received directly from the DU performing sidelink communications with the UE or relayed via one or more parent DUs of the DU performing sidelink communications with the UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
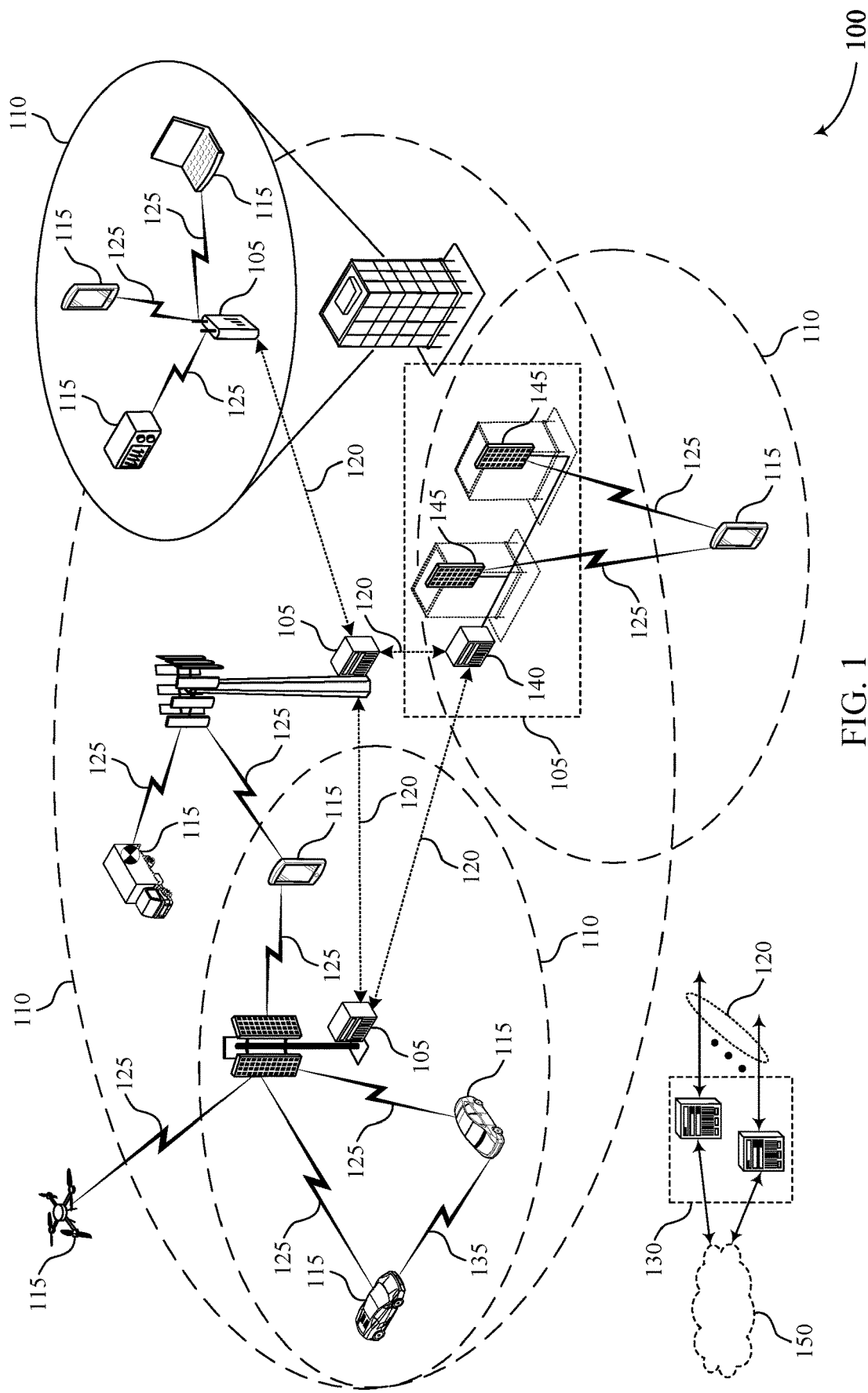
FIG. 1 illustrates an example of a wireless communications system that supports integrated access and backhaul (IAB) sidelink function control in accordance with aspects of the present disclosure.

The described techniques support sidelink communications between nodes of an integrated access and backhaul (IAB) network. The network may include one or more connected base stations and user equipments (UEs) supporting multiple communication links within a relay chain. A core network may be associated with one or more access networks (ANs). In networks employing distributed node techniques, each AN may include a central unit (CU) (e.g., associated with a donor base station) and one or more distributed units (DUs) (e.g., also associated with the donor base station) for scheduling communications with mobile terminals (MTs) (e.g., associated with an intermediary base station) or with UEs of the network. A network node that is configured with a DU and MT to support communications between an IAB donor, other IAB nodes, and UEs may be referred to as an IAB node. According to techniques and architectures described herein, an IAB node may be configured with sidelink functionality to support sidelink communications.

A sidelink capable IAB node may indicate that it supports sidelink communications. In some cases, the indication is transmitted over a Uu link to a parent node or to a child node. For example, the IAB node may indicate that it supports sidelink communications via a master information block (MIB), system information block (SIB), or via radio resource control (RRC) message. Additionally, the IAB node may indicate its capability to support IAB relaying via a sidelink connection. For example, the IAB node may indicate its capability to support sidelink functionality via a sidelink MIB or via a unicast message. As described in further detail herein, these capability indication techniques may support IAB topology discovery as well as improved communication reliability and throughput in some scenarios, such as high mobility scenarios.

In some aspects of the described techniques, the CU associated with a base station may identify or otherwise select a DU of an IAB node to control or otherwise manage sidelink communications with the UE. The CU may determine a configuration of sidelink parameters for the sidelink communications, which may include at least the identification information for the selected DU. The CU may transmit the indication of the configuration to the IAB node to identify which DU the UE is to use, at least to some degree, for the sidelink communications. The DU of the IAB node connected to the UE may identify the configuration for the sidelink parameters (e.g., which DU is the selected DU) and then provide an indication of the selected DU to the UE. The UE may identify or otherwise determine which DU is the selected DU and then use that DU, at to some degree, to control the sidelink communications. For example, the UE may use the selected DU for timing synchronization.

Aspects of the disclosure are initially described in the context of wireless communications systems. Aspects of the disclosure are further described with respect to a wireless communications system illustrating various connections in an IAB network with sidelink functionality, a network that illustrates sidelink communications, and a process flow diagram. Aspects of the disclosure are further illustrated by and described with reference to apparatus diagrams, system diagrams, and flowcharts that relate to integrated access and backhaul sidelink communications.

FIG. 1 illustrates an example of a wireless communications system 100 that supports IAB sidelink function control in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, IAB nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ N4 seconds, where $\Delta f_{max}$ may represent the maximum supported subcarrier spacing, and $\Delta f_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others).

In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 (e.g., a CU function of, or otherwise associated with, the base station 105) may select, from a set of DUs associated with the CU, a DU of an IAB node to control sidelink communications for a UE 115. The base station 105 may determine a configuration of sidelink parameters for the sidelink communications with the UE 115, the sidelink parameters comprising an identification of the selected DU. The base station 105 may transmit, to the IAB node performing sidelink communications with the UE, an indication of the configuration of sidelink parameters for the sidelink communications.

A base station 105 (e.g., a DU function of, or otherwise associated with, the base station 105) may identify a selected DU, the selected DU selected by a CU to control sidelink communications for the UE 115. The base station 105 may determine a configuration of sidelink parameters for the sidelink communications with the UE 115 based at least in part on the indication, the sidelink parameters comprising an identification of the selected DU. The base station 105 may transmit an indication of the sidelink parameters to the UE 115.

A UE 115 may receive, from a DU of an IAB node performing sidelink communications with the UE 115, a configuration of sidelink parameters for sidelink communications with the DU. The UE 115 may identify a selected DU, the selected DU selected by a CU to control sidelink communications for the UE 115. The UE 115 may perform sidelink communications based at least in part on the selected DU.

Figure 2:
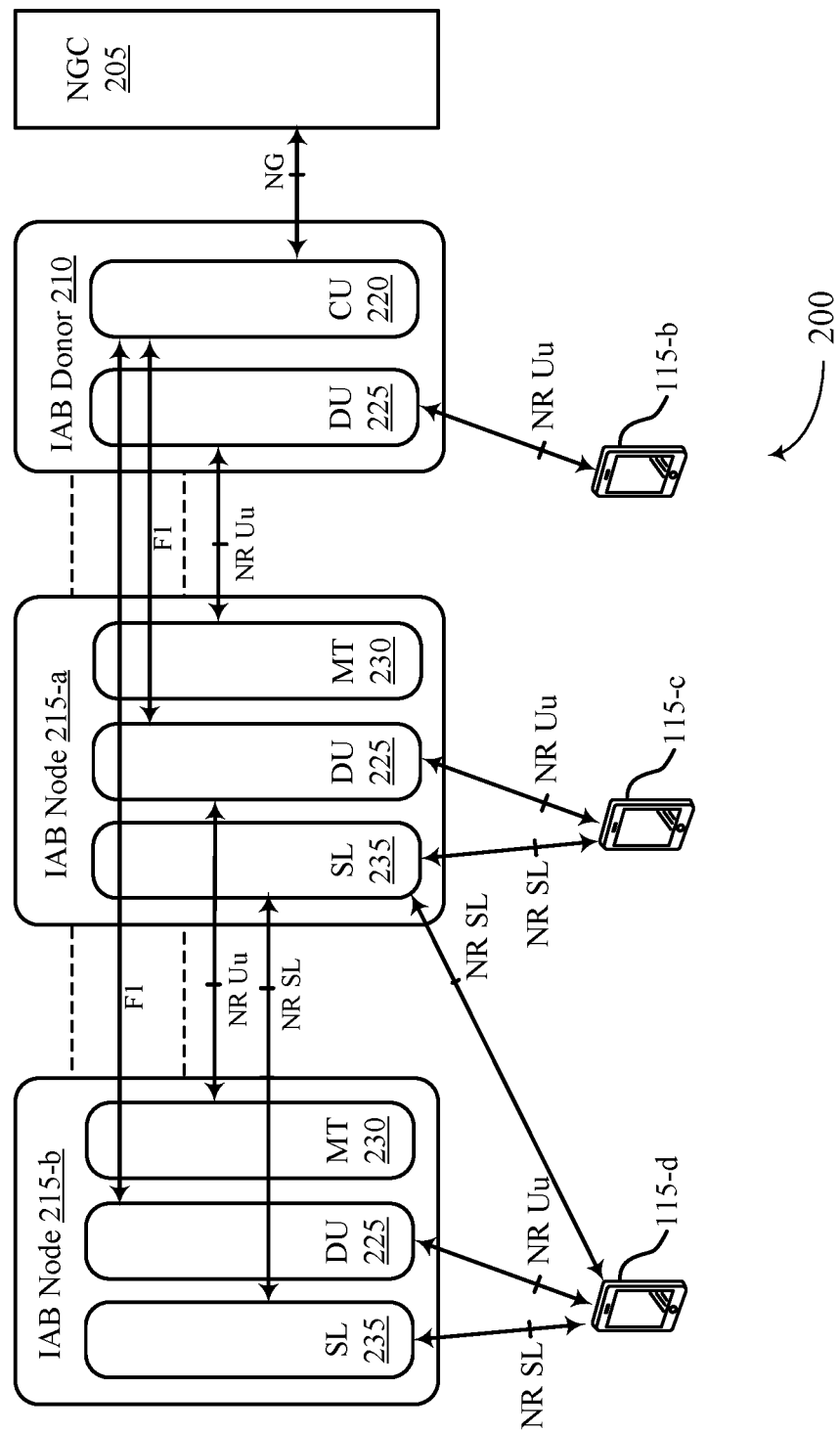
FIG. 2 illustrates an example of a wireless communications system that supports IAB sidelink function control in accordance with aspects of the present disclosure.

FIG. 2 illustrates an example of a wireless communications system 200 that supports IAB sidelink function control in accordance with aspects of the present disclosure. Wireless communications system 200 may include a core network 205 (e.g., a next generation core network (NGC)), an IAB donor 210, IAB nodes 215, and UEs 115, where IAB nodes 215 may be partially controlled by each other and/or the IAB donor 210. The IAB donor 210 and IAB nodes 215 may be examples of aspects of base stations 105, and core network 205 may be an example of aspects of core network 130, as described with reference to FIG. 1. IAB donor 210 and one or more IAB nodes 215 may be configured as (e.g., or in communication according to) some relay chain.

For example, an access network (AN) may refer to communications between access nodes (e.g., IAB donor 210), IAB nodes 215-a and 215-b, and one or more UEs 115 (e.g., UEs 115-b, 115-c, and 115-d). The IAB donor 210 may facilitate connection between the core network 205 and the AN (e.g., via a wireline or wireless connection to the core network 205). That is, an IAB donor 210 may refer to a radio access network (RAN) node with a wireline or wireless connection to core network 205. The IAB donor 210 may include a CU 220 and at least one DU 225, where the CU 220 may communicate with the core network 205 over an NG interface (e.g., some backhaul link). The CU 220 may host layer 2 (L3) (e.g., radio resource control (RRC), service data adaption protocol (SDAP), packet data convergence protocol (PDCP), etc.) functionality and signaling. The at least one DU 225 may host lower layer, such as layer 1 (L1) and layer 2 (L2) (e.g., radio link control (RLC), media access control (MAC), physical (PHY), etc.) functionality and signaling, and may each be at least partially controlled by the CU 220. The DU 225 may support one or multiple different cells. IAB donor 210 and IAB nodes 215-a and 215-b may communicate over an F1 interface according to some protocol that defines signaling messages (e.g., F1-AP protocol). Additionally, CU 220 may communicate with the core network 205 over an NG interface (which may be an example of a portion of backhaul link), and may communicate with other CUs 220 (e.g., a CU associated with an alternative IAB donor 210) over an Xn-C interface (which may be an example of a portion of a backhaul link).

IAB nodes 215 may refer to a RAN node that provides IAB functionality (e.g., access for UEs 115, wireless self-backhauling capabilities, etc.). IAB nodes 215 may include a distributed unit (DU) 225 and a mobile terminal (MT) 230. A DU 225 may act as a distributed scheduling node towards child nodes associated with the IAB node 215, and the MT 230 may act as a scheduled node towards parent nodes associated with the IAB node 215. That is, an IAB donor 210 may be referred to as a parent node in communication with one or more child nodes (e.g., an IAB donor may relay transmissions for UEs through one or more other IAB nodes 215). Additionally, an IAB node 215 may also be referred to as a parent node or a child node to other IAB nodes 215, depending on the relay chain or configuration of the AN. Therefore, the MT entity of IAB nodes 215 (e.g., MTs 230) may provide a Uu interface for a child node to receive signaling from a parent IAB node, and the DU interface (e.g., DUs 225) may provide a Uu interface for a parent node to signal to a child IAB node or UE 115.

For example, IAB node 215-*a* may be referred to a parent node associated with IAB node 215-*b*, and a child node associated with IAB donor 210. The IAB donor 210 may include a CU 220 with a wireline (e.g., optical fiber) or wireless connection to the core network 205, and may act as parent node to IAB nodes 215-*a* and 215-*b*. For example, the DU 225 of IAB donor 210 may relay transmissions to UEs 115-*c* and 115-*d* through IAB nodes 215-*a* and 215-*b*, and may directly signal transmissions to the UE 115-*b*. The CU 220 of IAB donor 210 may signal communication link establishment via an F1 interface to IAB nodes 215-*a* and 215-*b*, and the IAB nodes 215-*a* and 215-*b* may schedule transmissions (e.g., transmissions to the UEs 115 relayed from the IAB donor 210) through the DUs 225. That is, data may be relayed to and from IAB nodes 215-*a* and 215-*b* via signaling over an NR Uu interface to MT 230 of the IABs node 215-*a* and 215-*b*. Communications with IAB node 215-*a* may be scheduled by DU 225 of IAB donor 210 and communications with IAB node 215-*b* may be scheduled by DU 225 of IAB Node 215-*a*.

As described herein, the wireless communications system 200 may support nodes configured with sidelink functionality. For example, IAB nodes 215-*a* and 215-*b* include sidelink functionality 235. The sidelink functionality 235 may be supported by the components that support the DU 225 and/or the MT 230 or may be supported by separate components, such as separate radio frequency circuitry and antennas.

IAB nodes 215 may advertise (e.g., broadcast) their support for IAB functionality (e.g., that the IAB node 215 is an IAB relay) and sidelink functionality. For example, the IAB node 215 may advertise over a sidelink connection that the IAB node 215 is an IAB relay. Additionally, or alternatively, the IAB node 215 may advertise over a Uu link connection that the IAB node 215 includes sidelink functionality 235. These techniques may support IAB topology determination. For example, UEs 115 that receive these indications (advertisements) may account for these functionalities for relay selection. The sidelink functionality that is advertised over a Uu link may be broadcast in system information such as a MIB or a SIB or transmitted (e.g., unicast) in an RRC message. The IAB node functionality (e.g., IAB relay indication) may be transmitted by the IAB node 215 using a sidelink MIB (SL-MIB) or in a unicast message to a UE 115.

In some cases, the indications of IAB and sidelink functionality may be implicit or explicit. For example, the IAB node 215 may indicate a quasi co-location (QCL) relationship between a downlink reference signal corresponding to the DU 225 of the IAB node 215 and a sidelink reference signal corresponding to the sidelink functionality 235 of the IAB node 215. The downlink reference signal may be an example of a synchronization signal block (SSB) or a channel state information reference signal (CSI-RS). The sidelink reference signal may be an example of a sidelink SSB (SL-SSB) or a SL-CSI-RS. The QCL relationship may be indicated or advertised by the IAB node 215 over the sidelink connection and/or the Uu connection. Further, the QCL relationship may be configured at or indicated to the IAB node 215 by a parent node, control node, or CU 220. For example, the IAB node 215-*a* may configure the QCL relationship at the IAB node 215-*b* (e.g., the IAB node 215-*a* is a parent node of the IAB node 215-*b*).

The sidelink functionality 235 may support sidelink UE-to-UE relay capability or UE to network relay capability. In an example a UE-to-UE relay scenario, the IAB node 215 may establish a first sidelink connection with the UE 115-*c* and a second sidelink connection with the UE 115-*d*. The IAB node 215 may relay communications, using sidelink functionality 235, between the UE 115-*c* and 115-*d*. In an example UE to network relay scenario, the IAB node 215 may establish the sidelink connection with the UE 115-*c* and relay communications between the UE 115-*c* and the core network 205 (e.g., the NGC). The IAB node 215 may indicate its capability to support one or both of UE to UE relaying or UE to network relaying.

As described herein, a UE 115 that receives an indication of IAB and/or SL functionality from an IAB node 215 may select a relay based on the indication. For example, a UE 115 may determine to use a Uu connection to a DU 225 of an IAB node 215 or a sidelink connection to sidelink functionality 235 of the IAB node 215 for supporting communications (e.g., relaying communications). In some examples, the determination is performed based on a selection at the UE 115, an indication by the IAB node 215, the CU 220, or another network node (e.g., another IAB node 215).

In some cases, the selection of the IAB node 215 as well as the communication link (e.g., the Uu or sidelink) that is used may be based on the mobility state of the UE 115 and the IAB node 215. For example, when a IAB node 215 is implemented in a vehicle such as a train, bus, plane, etc., and various UEs 115 traveling with the vehicle are served by the IAB node 215, then the UEs 115 traveling with (within) the vehicle may be served by the DU 225 of the IAB node 215, since the IAB node 215 may appear to be a fixed cell to the UEs 115 traveling with the IAB node 215. However, external UEs 115 (e.g., UEs 115 that are not traveling with the vehicle carrying the IAB node 215) that may be in communication with the IAB node 215, may be served using sidelink functionality 235. This configuration may be used because sidelink functionality may be configured for high mobility environments (e.g., both the IAB node 215 and UE 115 are mobile).

Further, for the mobility scenario described above, the MT 230 of the IAB node 215 may communicate with a stationary parent DU 225 using a Uu link. If the parent DU 225 is mobile, then MT 230 of the IAB node 215 may communicate with the sidelink functionality 235 of the parent IAB node 215. For example, if both the IAB node 215-*a* and the IAB node 215-*b* are mobile, then the IAB node 215-*b* may communicate with the sidelink functionality 235 of the parent IAB node 215-*a*. As an alternative to these mobility designs, then sidelink relaying may be used instead of mobile IAB functionality. These techniques may include a star topology optimization, where the topology is configured as multiple "stars," where the hub of each star is the vehicle IAB node 215 and the clients of the hub are the UEs 115 within the vehicle. In such cases, the IAB node 215 may communicate with the UEs 115 using the sidelink functionality 235.

In some cases, the sidelink functionality 235 may be leveraged to support the IAB node 215. For example, some of the IAB configuration information may be indicated or advertised over a sidelink connection. Such information may include cell identifiers (cell IDs), frequency information (e.g., synchronization raster information), some or all of the information that is included in a SIB1 message (e.g., SSB bitmap, periodicity, QCL relationship information), random access channel (RACH) configuration), cell barred statuses of DUs 225, children support of IAB DUs 225, TDD configurations and/or hard, soft, not-available (H/S/NA) configuration of slots of DU 225 cells, transmission-reception point (TRP) information of the DU 225, mobility state of the IAB node 215, or any combination thereof. Further, some or all of the sidelink configuration information may be indicated or advertised over the Uu link (e.g., downlink connection). Such sidelink information may include resource information, such as SSB information.

In some cases, the UE 115 associated with a DU 225 may use the IAB node 215 serving the UE 115 to control various aspects of the sidelink communications. However, in other cases it may be beneficial to follow the control of the controlling DU 225 or from a different DU. For example, some aspects of the sidelink communications may benefit from both sidelink UE being controlled, at least to some degree, by a common or shared DU 225. For example, UE 115-*d* and UE 115-*c* may be performing sidelink communications, with the sidelink function 235 of each respective DU 215 managing aspects of the sidelink communications for their respective UEs. However, in some situations the sidelink communications may be improved by having at least some of the sidelink communication parameters controlled by a shared or common entity, such as a common DU.

Accordingly, aspects of the described techniques enable IAB sidelink control by a collocated IAB DU 225 or by a parent IAB DU 225. For example, CU 220 may identify, determine, or otherwise select a DU 225 of an IAB node 215 to control the sidelink communications for the UE 115. CU 220 may select the DU 225 from a set of available DUs 225 associated with CU 220. In the non-limiting example illustrated in FIG. 2, the set of available DUs 225 may include DU 225 of IAB node 215-*b*, DU 225 of IAB node 215-*a*, and/or DU 225 of IAB donor 210.

In some aspects, the selected DU 225 may be either the DU 225 of the IAB node 215 having the sidelink connection with the UE 115 or a parent DU 225 (e.g., an upstream DU 225) of the IAB node 215 having the sidelink connection with the UE 115. So for example and from the perspective of UE 115-*d*, the selected DU 225 may be either DU 225 of IAB node 215-*b*, DU at 225 of IAB node 215-*a*, or DU 225 of IAB donor 210.

As one non-limiting example, this may include CU 220 selecting a DU 225 that is co-located with IAB node 215 having the sidelink connection with the UE 115. For example, DU node 225 of IAB node 215-*b* may be selected to control sidelink communications for UE 115-*d* based on sidelink function 235 being collocated within the same IAB node 215 of the DU 225.

In another non-limiting example, this may include CU 220 identifying or otherwise determining the QCL relationship between a synchronization signal (e.g., a first synchronization signal, such as a SSB) of the DU 225 of the IAB node 215 performing sidelink communications with UE 115 and a synchronization signal (e.g., a second synchronization signal, such as a SSB) of the selected DU 225. For example, if the two synchronization signals are QCL with respect to each other, then this may be the basis for CU 220 to select which DU 225 to control aspects of the sidelink communications with the UE 115. For example, if the synchronization signal transmitted by DU 225 of IAB node 215-*b* has a QCL relationship with DU 225 of IAB node 215-*b* and/or with DU 225 of IAB donor 210, then either DU 225 may be selected to control aspects of the sidelink communications for UE 115.

In another non-limiting example, this may include CU 220 selecting a DU 225 to control aspects of the sidelink communications based on the type of sidelink communications being performed (e.g., the PSCCH vs PSSCH vs PSFCH, unicast vs groupcast/broadcast, high priority vs low priority, high latency vs low latency, high reliability vs low reliability, etc.). In some aspects, this may also be based on the set of sidelink resources being used for the sidelink communications (e.g., time resources, frequency recourses, spatial resources, code resources, an amount of resources, etc.). Accordingly, CU 220 may determine or otherwise identify the type of sidelink communications being performed and/or the set of sidelink resources available for the sidelink communications, and select the DU 225 to control aspects of the sidelink communications accordingly.

In some aspects, the selected DU 225 may be selected based on configuration messages exchanged between the DU 225 and CU 220. For example, CU 220 may exchange various configuration messages with the DU 225 of the IAB node 215 serving the UE 115 and/or the parent DU 225. For example, the exchanged configuration messages may identify support for, capability of, available configurations for, and the like, for each DU 225 to control the aspects of the sidelink communications between the UE 115. CU 220 may identify and select a specific DU 225 based on the exchange of configuration messages.

Once CU 220 has selected the DU 225 to control sidelink communications for the UE 115, CU 220 may determine a configuration of the sidelink parameters for the sidelink communications with the UE 115. Although the configuration of the sidelink parameters may include various configuration parameters for the sidelink communications, such configuration at least includes information identifying or otherwise indicating the selected DU 225. For example, the DU 225 that selected to control the sidelink communications for the UE 115 may be identified based upon its ID number or other identifying information. CU 220 may transmit or otherwise provide an indication of the configuration of the sidelink parameters for the sidelink communications (e.g., to identify the selected DU 225) to the IAB node 215 performing sidelink communications with the UE 115. For example, in addition to identifying the selected DU 225, the indication may also indicate that the UE 115 as to perform timing synchronization with the selected DU 225 for the sidelink communications and/or receive sidelink grants over a Uu interface (e.g., the cellular interface) from the selected DU 225. For example, the sidelink function 235 may manage some aspects of the sidelink communications between the UE 115, but the timing synchronization aspects for the sidelink communications may be based on, or otherwise originate from, the selected DU 225. CU 220 may transmit or otherwise provide the indication directly to the IAB node 215 performing sidelink communications with the UE 115, a relay the indication via one or more parent DUs 225/IAB nodes 215. Signaling techniques that may be utilized to transmit or otherwise provide the indication may include, but are not limited to, an RRC message, a MAC CE message, an F1 interface message, a DCI message, and SCI message, and the like, alone or in any combination.

The DU 225 of the IAB node 215 performing sidelink communications with the UE 115 may identify or otherwise determine the selected DU 225 (e.g., based on the indication and/or other signaling techniques). Based on the configuration of sidelink parameters, the DU 225 may identify or otherwise determine the selected DU 225 and transmit an indication of the sidelink parameters (e.g., an indication of the selected DU 225) to the UE 115. The UE 115 may generally receive the configuration of sidelink parameters from its DU 225 and identify or otherwise determine the selected DU 225. Accordingly, the UE 115 may perform the sidelink communications based at least in part on the selected DU 225 (e.g., such as perform timing synchronization operations with the selected DU 225 for the sidelink communications).

Figure 3:
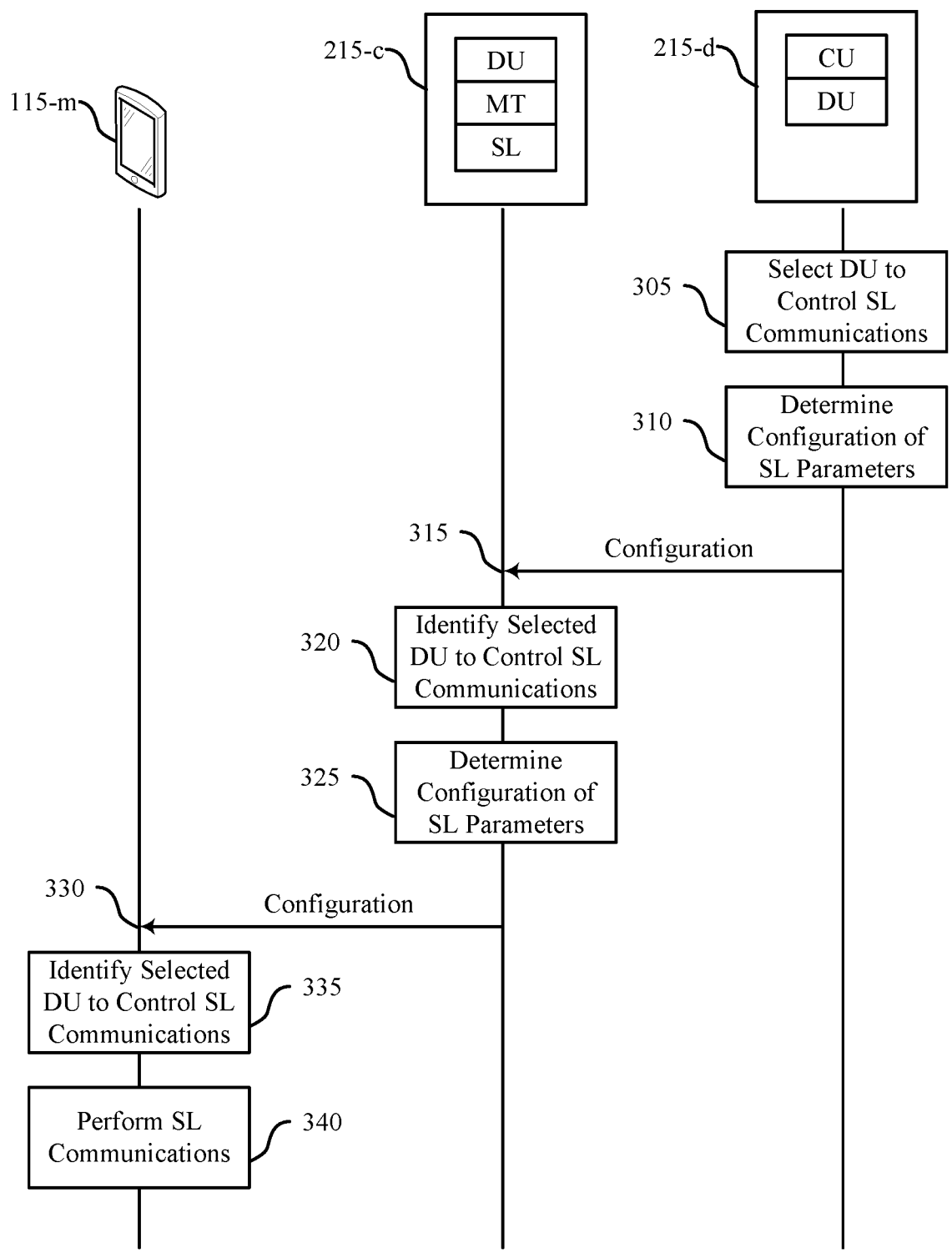
FIG. 3 illustrates an example of a process that supports IAB sidelink function control in accordance with aspects of the present disclosure.

FIG. 3 illustrates an example of a process 300 that supports IAB sidelink communications in accordance with aspects of the present disclosure. Process 300 may implement aspects of wireless communications systems 100 and/or 200. Aspects of process 300 may be implemented at or implemented by UE 115-*m*, IAB node 215-*c* and/or IAB node 215-*d*, which may be examples of corresponding devices described herein. In some aspects, IAB node 215-*c* may have a sidelink connection with UE 115-*m*, with UE 115-*m* performing sidelink communications with other UE. IAB node 215-*c* may include a DU function, an MT function, and a sidelink function, which may be examples of the corresponding devices described herein. IAB node 215-*d* may be an example of a donor node and may include a CU function and a DU function.

At 305, the CU function of IAB node 215-*d* may identify, select, or otherwise determine the DU of an IAB node 215 to control sidelink communications for UE 115-*m*. The CU function may select the DU from a set of available DUs associated with the CU function. Broadly, the selected DU may be the DU of the IAB node 215 having the sidelink connection with UE 115-*m* (e.g., the DU of IAB node 215-*c*) or a parent DU of the IAB node 215 (e.g., the DU of IAB node 215-*d*).

In some aspects, this may include the CU function selecting the DU of the IAB node 215 based on the DU being collocated within the IAB node 215 having the sidelink connection with the UE 115-*m*. For example, the CU function may select the DU of IAB node 215-*c* based on that DU being collocated within the IAB node 215-*c* (e.g., being collocated within the IAB node 215-*c* having the sidelink function that manages aspects of the sidelink communications).

In some aspects, this may include the CU function selecting the DU of the IAB node 215 based on the QCL relationship for synchronization signals transmitted by the sidelink function of the IAB node 215 having the sidelink connection with the UE 115-*m* and the selected DU node. For example, if the sidelink function of IAB node 215-*c* transmits synchronization signals (e.g., sidelink SSB) that are QCL with respect to synchronization signals transmitted by the DU function of IAB node 215-*d*, and this may indicate that the DU function of IAB node 215-*d* may be the selected DU function.

In some aspects, this may include the CU function selecting the DU of the IAB node 215 based on the type of sidelink communications being performed and/or based on a set of sidelink resources used for the sidelink communications. For example, some DU functions may be configured or otherwise support certain types of sidelink communications over other types of sidelink communications (e.g., low latency v. high latency, low priority v. high priority, etc.) and/or may be configured with available sidelink resources that are more suited to the sidelink communications. Accordingly, the CU function of IAB node 215-*d* may select a specific DU based on the type of sidelink communications supported by the selected DU and/or based on the sidelink resources of the selected DU.

At 310, the CU function of IAB node 215-*d* may identify or otherwise determine a configuration of sidelink parameters to be used for the sidelink communications with UE 115-*m*. Among other parameters/values used for the sidelink communications, the configuration of sidelink parameters may at least include an indication of information identifying the selected DU. That is, the configuration of sidelink parameters may indicate which DU is to be used to control, at least to some degree, the sidelink communications of UE 115-*m*.

Accordingly and at 315, the CU function of IAB node 215-*d* may transmit or otherwise provide an indication of the configuration of sidelink parameters for the sidelink communications to IAB node 215-*c* performing sidelink communications with UE 115-*m*. The indication may be provided via RRC messaging, via an F1 interface message, via a MAC CE message, a DCI message, and SCI message, and the like, alone or in any combination.

At 320, the DU function of IAB node 215-*c* may identify the selected DU. For example, the DU function of IAB node 215-*c* may identify the selected DU based on the configuration of sidelink parameters indicated by the CU function of IAB node 215-*d*. At 325, the DU function of IAB node 215-*c* may determine the configuration of sidelink parameters. Again, this may be based on the configuration of sidelink parameters indicated by the CU function of IAB node 215-*d*.

At 330, the DU function of IAB node 215-*c* may transmit or otherwise provide an indication of the configuration of sidelink parameters to UE 115-*m*. For example, the configuration may be transmitted to UE 115*m* via a PC5 sidelink interface and/or a Uu interface.

Accordingly and at 335, UE 115-*m* may identify the selected DU based at least in part on the configuration of sidelink parameters indicated by the DU function of IAB node 215-*c*. UE 115-*m* may, at 340 perform the sidelink communications based at least in part on the selected DU. For example, the configuration of sidelink parameters may also carry or otherwise convey an indication that UE 115-*m* is to use the selected DU for timing synchronization purposes for the sidelink communications. Accordingly, UE 115-*m* may obtain timing synchronization (e.g., derivation of the sidelink timing source) from the selected DU for the sidelink communications. As discussed above, the selected DU may be the DU function of the IAB node 215 performing sidelink communications with UE 115-*m* or may be a parent DU function.

Figure 4:
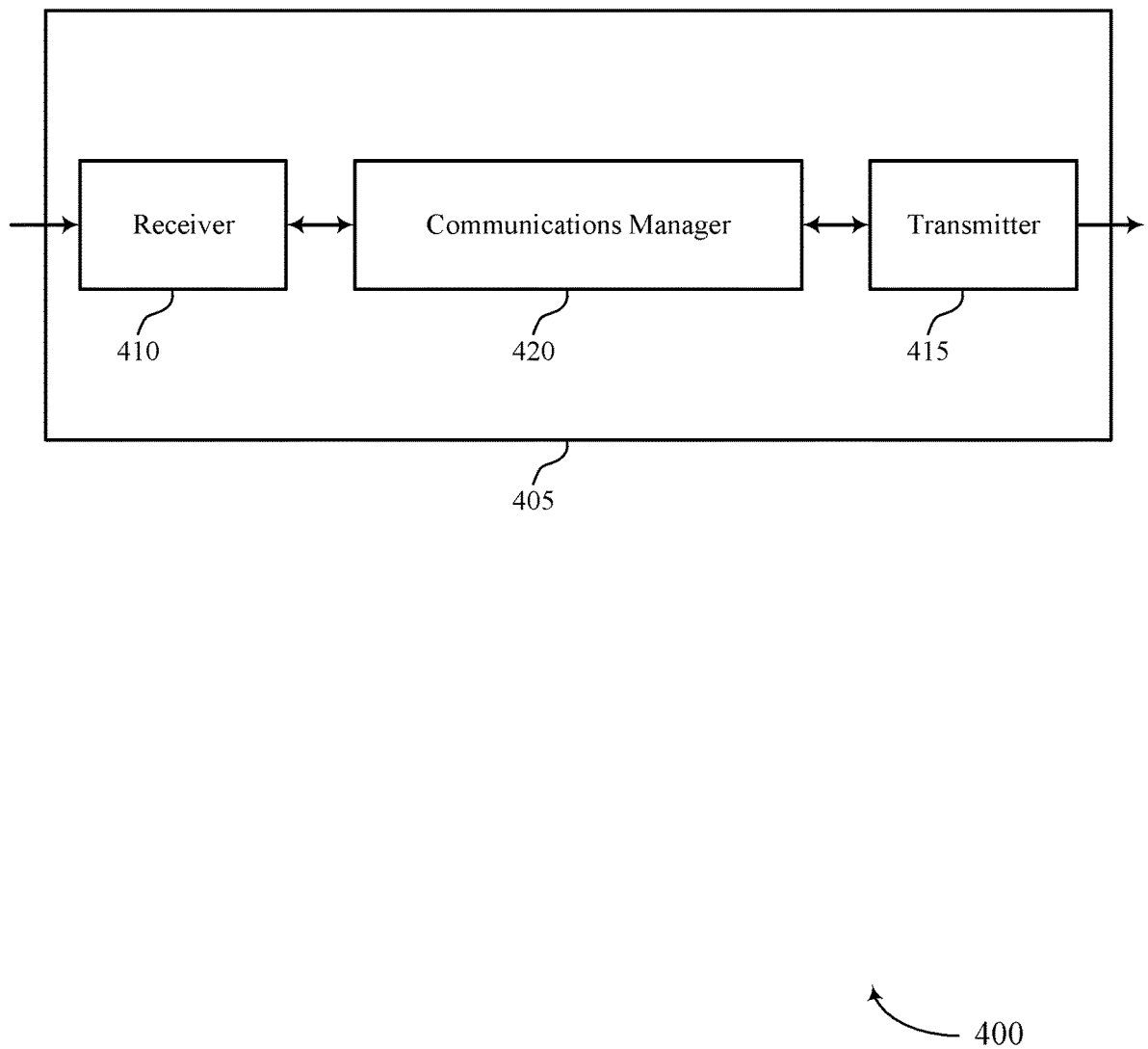
FIGS. 4 and 5 show block diagrams of devices that support IAB sidelink function control in accordance with aspects of the present disclosure.

FIG. 4 shows a block diagram 400 of a device 405 that supports IAB sidelink function control in accordance with aspects of the present disclosure. The device 405 may be an example of aspects of a base station 105 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to IAB sidelink function control). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to IAB sidelink function control). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of IAB sidelink function control as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a CU in accordance with examples as disclosed herein. For example, the communications manager 420 may be configured as or otherwise support a means for selecting, from a set of DUs associated with the CU, a DU of an IAB node to control sidelink communications for a UE. The communications manager 420 may be configured as or otherwise support a means for determining a configuration of sidelink parameters for the sidelink communications with the UE, the sidelink parameters including an identification of the selected DU. The communications manager 420 may be configured as or otherwise support a means for transmitting, to the IAB node performing sidelink communications with the UE, an indication of the configuration of sidelink parameters for the sidelink communications.

Additionally, or alternatively, the communications manager 420 may support wireless communication at a DU of an IAB node performing sidelink communications with a UE in accordance with examples as disclosed herein. For example, the communications manager 420 may be configured as or otherwise support a means for identifying a selected DU, the selected DU selected by a CU to control sidelink communications for the UE. The communications manager 420 may be configured as or otherwise support a means for determining a configuration of sidelink parameters for the sidelink communications with the UE based on the indication, the sidelink parameters including an identification of the selected DU. The communications manager 420 may be configured as or otherwise support a means for transmitting an indication of the sidelink parameters to the UE.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for improving control of sidelink communications by selecting a DU that may be the DU of the IAB node serving the sidelink UE or a parent DU of the IAB node.

Figure 5:
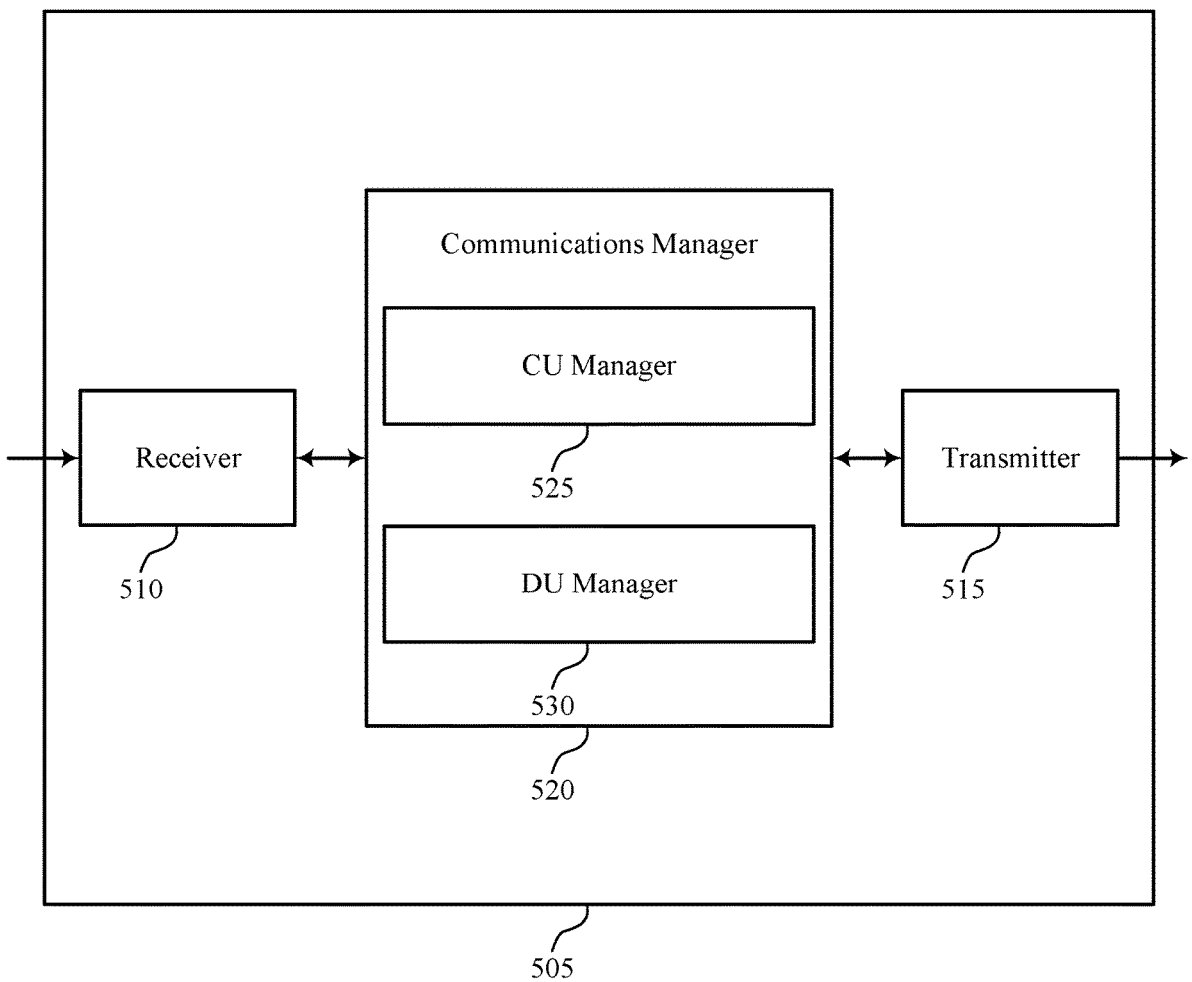

FIG. 5 shows a block diagram 500 of a device 505 that supports IAB sidelink function control in accordance with aspects of the present disclosure. The device 505 may be an example of aspects of a device 405 or a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to IAB sidelink function control). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to IAB sidelink function control). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of IAB sidelink function control as described herein. For example, the communications manager 520 may include a CU manager 525 a DU manager 530, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a CU in accordance with examples as disclosed herein. The CU manager 525 may be configured as or otherwise support a means for selecting, from a set of DUs associated with the CU, a DU of an IAB node to control sidelink communications for a UE. The CU manager 525 may be configured as or otherwise support a means for determining a configuration of sidelink parameters for the sidelink communications with the UE, the sidelink parameters including an identification of the selected DU. The CU manager 525 may be configured as or otherwise support a means for transmitting, to the IAB node performing sidelink communications with the UE, an indication of the configuration of sidelink parameters for the sidelink communications. In some examples, the selected DU may include the DU of the IAB node having a sidelink connection with the UE or a parent DU of the IAB node.

Additionally, or alternatively, the communications manager 520 may support wireless communication at a DU of an IAB node performing sidelink communications with a UE in accordance with examples as disclosed herein. The DU manager 530 may be configured as or otherwise support a means for identifying a selected DU, the selected DU selected by a CU to control sidelink communications for the UE. The DU manager 530 may be configured as or otherwise support a means for determining a configuration of sidelink parameters for the sidelink communications with the UE based on the indication, the sidelink parameters including an identification of the selected DU. The DU manager 530 may be configured as or otherwise support a means for transmitting an indication of the sidelink parameters to the UE.

Figure 6:
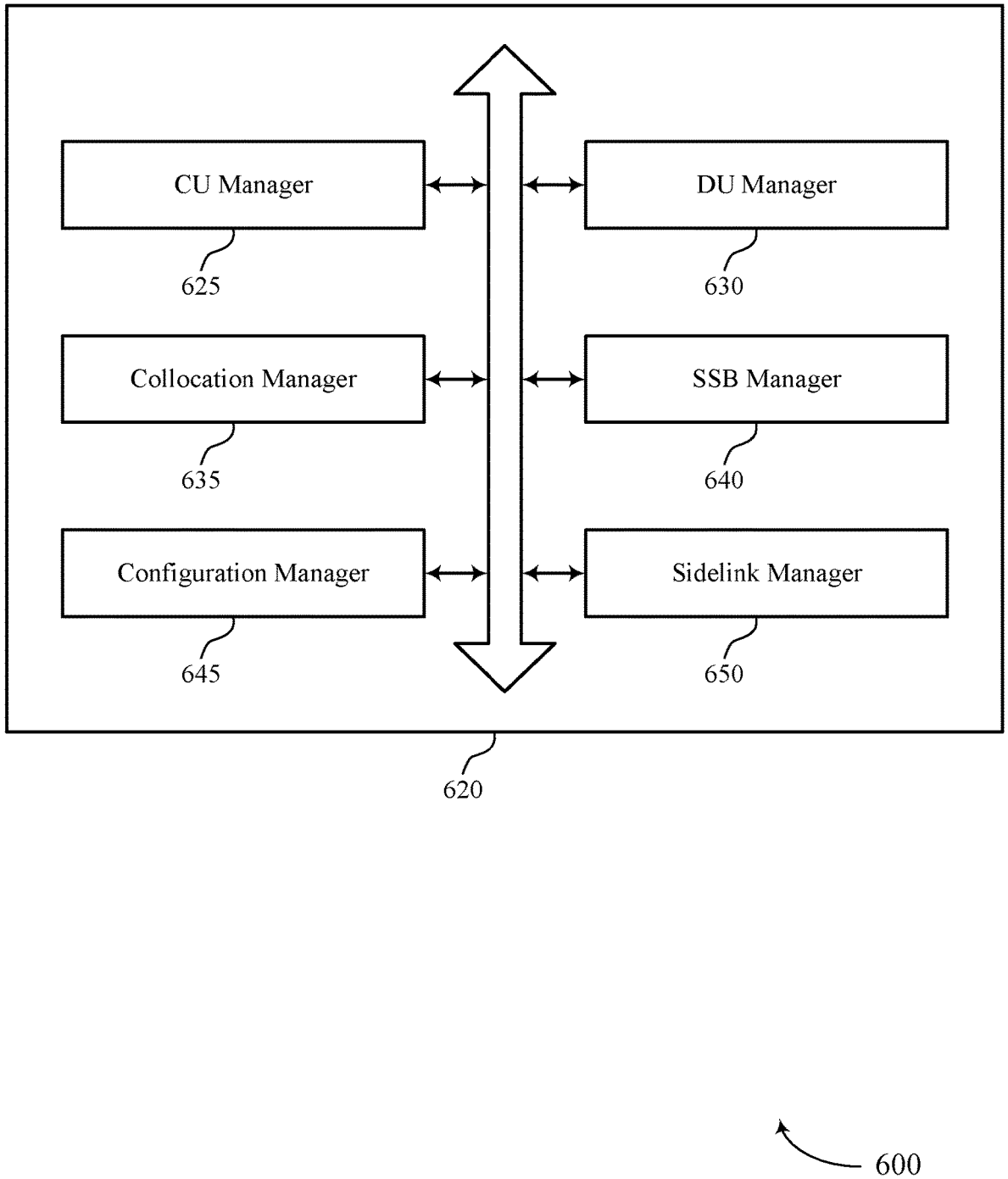
FIG. 6 shows a block diagram of a communications manager that supports IAB sidelink function control in accordance with aspects of the present disclosure.

FIG. 6 shows a block diagram 600 of a communications manager 620 that supports IAB sidelink function control in accordance with aspects of the present disclosure. The communications manager 620 may be an example of aspects of a communications manager 420, a communications manager 520, or both, as described herein. The communications manager 620, or various components thereof, may be an example of means for performing various aspects of IAB sidelink function control as described herein. For example, the communications manager 620 may include a CU manager 625, a DU manager 630, a collocation manager 635, an SSB manager 640, a configuration manager 645, a sidelink manager 650, or any combination thereof. Each of these components may communicate, directly or indirectly, with one another (e.g., via one or more buses).

The communications manager 620 may support wireless communication at a CU in accordance with examples as disclosed herein. The CU manager 625 may be configured as or otherwise support a means for selecting, from a set of DUs associated with the CU, a DU of an IAB node to control sidelink communications for a UE. In some examples, the CU manager 625 may be configured as or otherwise support a means for determining a configuration of sidelink parameters for the sidelink communications with the UE, the sidelink parameters including an identification of the selected DU. In some examples, the CU manager 625 may be configured as or otherwise support a means for transmitting, to the IAB node performing sidelink communications with the UE, an indication of the configuration of sidelink parameters for the sidelink communications. In some examples, the selected DU may include the DU of the IAB node having a sidelink connection with the UE or a parent DU of the IAB node.

In some examples, to support selecting the DU, the collocation manager 635 may be configured as or otherwise support a means for selecting the DU of the IAB node having a sidelink connection with the UE based on the DU being collocated within the IAB node having the sidelink connection with the UE.

In some examples, the SSB manager 640 may be configured as or otherwise support a means for determining that a first synchronization signal transmitted from the selected DU is quasi-collocated with respect to a second synchronization signal transmitted from the DU performing sidelink communications with the UE, where the selecting is based on the quasi-collocated first synchronization signal and second synchronization signal.

In some examples, the configuration manager 645 may be configured as or otherwise support a means for exchanging one or more configuration messages with the DU performing sidelink communications with the UE, the parent DU of the DU performing sidelink communications with the UE, or both, where the configuration of sidelink parameters is based on the exchanging.

In some examples, the sidelink manager 650 may be configured as or otherwise support a means for identifying a type of sidelink communications, a set of sidelink resources associated with the sidelink communications, or both, where the selecting is based on the identifying. In some examples, the indication is transmitted via an RRC message, an F1 interface message, MAC CE message, a DCI message, a SCI message, or a combination thereof. In some examples, the configuration of sidelink parameters includes an indication that the UE is to perform timing synchronization with the selected DU for the sidelink communications and/or to that the UE is to receive sidelink grants from the selected DU for the sidelink communications. In some examples, the indication is transmitted directly to the DU performing sidelink communications with the UE or relayed via one or more parent DUs of the DU performing sidelink communications with the UE.

Additionally, or alternatively, the communications manager 620 may support wireless communication at a DU of an IAB node performing sidelink communications with a UE in accordance with examples as disclosed herein. The DU manager 630 may be configured as or otherwise support a means for identifying a selected DU, the selected DU selected by a CU to control sidelink communications for the UE. In some examples, the DU manager 630 may be configured as or otherwise support a means for determining a configuration of sidelink parameters for the sidelink communications with the UE based on the indication, the sidelink parameters including an identification of the selected DU. In some examples, the DU manager 630 may be configured as or otherwise support a means for transmitting an indication of the sidelink parameters to the UE.

In some examples, the collocation manager 635 may be configured as or otherwise support a means for determining that the selected DU and the DU performing sidelink communications with the UE are collocated within the IAB node, where the selected DU is based on the collocation.

In some examples, the SSB manager 640 may be configured as or otherwise support a means for determining that a first synchronization signal transmitted from the selected DU is quasi-collocated with respect to a second synchronization signal transmitted from the DU performing sidelink communications with the UE, where the selected DU is based on the quasi-collocated first synchronization signal and second synchronization signal.

In some examples, the configuration manager 645 may be configured as or otherwise support a means for exchanging one or more configuration messages with the selected DU, the parent DU of the DU performing sidelink communications with the UE, or both, where the configuration of sidelink parameters is based on the exchanging.

In some examples, the sidelink manager 650 may be configured as or otherwise support a means for identifying a type of sidelink communications, a set of sidelink resources associated with the sidelink communications, or both, where the selected DU is based on the identifying. In some examples, the indication is received via an RRC message, an F1 interface message, MAC CE message, a DCI message, a SCI message, or a combination thereof. In some examples, the configuration of sidelink parameters includes an indication that the UE is to perform timing synchronization with the selected DU for the sidelink communications and/or that the UE is to receive sidelink grants from the selected DU for the sidelink communications. In some examples, the indication is received directly to the DU performing sidelink communications with the UE or relayed via one or more parent DUs of the DU performing sidelink communications with the UE.

Figure 7:
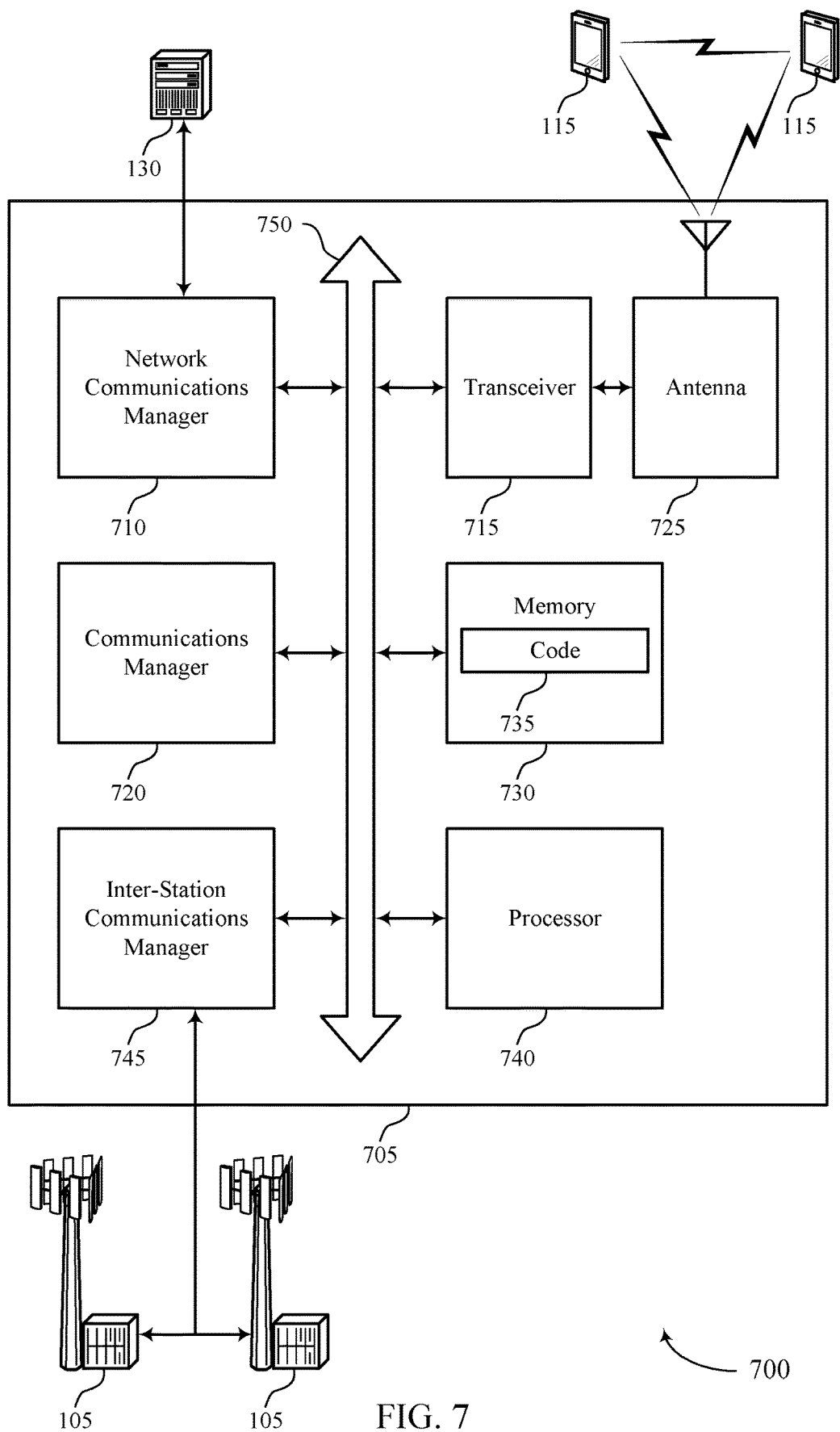
FIG. 7 shows a diagram of a system including a device that supports IAB sidelink function control in accordance with aspects of the present disclosure.

FIG. 7 shows a diagram of a system 700 including a device 705 that supports IAB sidelink function control in accordance with aspects of the present disclosure. The device 705 may be an example of or include the components of a device 405, a device 505, or a base station 105 as described herein. The device 705 may communicate wirelessly with one or more base stations 105, UEs 115, or any combination thereof. The device 705 may include components for bi-directional voice and data communications including components for transmitting and receiving communications, such as a communications manager 720, a network communications manager 710, a transceiver 715, an antenna 725, a memory 730, code 735, a processor 740, and an inter-station communications manager 745. These components may be in electronic communication or otherwise coupled (e.g., operatively, communicatively, functionally, electronically, electrically) via one or more buses (e.g., a bus 750).

The network communications manager 710 may manage communications with a core network 130 (e.g., via one or more wired backhaul links). For example, the network communications manager 710 may manage the transfer of data communications for client devices, such as one or more UEs 115.

In some cases, the device 705 may include a single antenna 725. However, in some other cases the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include RAM and ROM. The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a BIOS which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting IAB sidelink function control). For example, the device 705 or a component of the device 705 may include a processor 740 and memory 730 coupled to the processor 740, the processor 740 and memory 730 configured to perform various functions described herein.

The inter-station communications manager 745 may manage communications with other base stations 105, and may include a controller or scheduler for controlling communications with UEs 115 in cooperation with other base stations 105. For example, the inter-station communications manager 745 may coordinate scheduling for transmissions to UEs 115 for various interference mitigation techniques such as beamforming or joint transmission. In some examples, the inter-station communications manager 745 may provide an X2 interface within an LTE/LTE-A wireless communications network technology to provide communication between base stations 105.

The communications manager 720 may support wireless communication at a CU in accordance with examples as disclosed herein. For example, the communications manager 720 may be configured as or otherwise support a means for selecting, from a set of DUs associated with the CU, a DU of an IAB node to control sidelink communications for a UE. The communications manager 720 may be configured as or otherwise support a means for determining a configuration of sidelink parameters for the sidelink communications with the UE, the sidelink parameters including an identification of the selected DU. The communications manager 720 may be configured as or otherwise support a means for transmitting, to the IAB node performing sidelink communications with the UE, an indication of the configuration of sidelink parameters for the sidelink communications.

Additionally, or alternatively, the communications manager 720 may support wireless communication at a DU of an IAB node performing sidelink communications with a UE in accordance with examples as disclosed herein. For example, the communications manager 720 may be configured as or otherwise support a means for identifying a selected DU, the selected DU selected by a CU to control sidelink communications for the UE. The communications manager 720 may be configured as or otherwise support a means for determining a configuration of sidelink parameters for the sidelink communications with the UE based on the indication, the sidelink parameters including an identification of the selected DU. The communications manager 720 may be configured as or otherwise support a means for transmitting an indication of the sidelink parameters to the UE.

By including or configuring the communications manager 720 in accordance with examples as described herein, the device 705 may support techniques for improving control of sidelink communications by selecting a DU that may be the DU of the IAB node serving the sidelink UE or a parent DU of the IAB node.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of IAB sidelink function control as described herein, or the processor 740 and the memory 730 may be otherwise configured to perform or support such operations.

Figure 8:
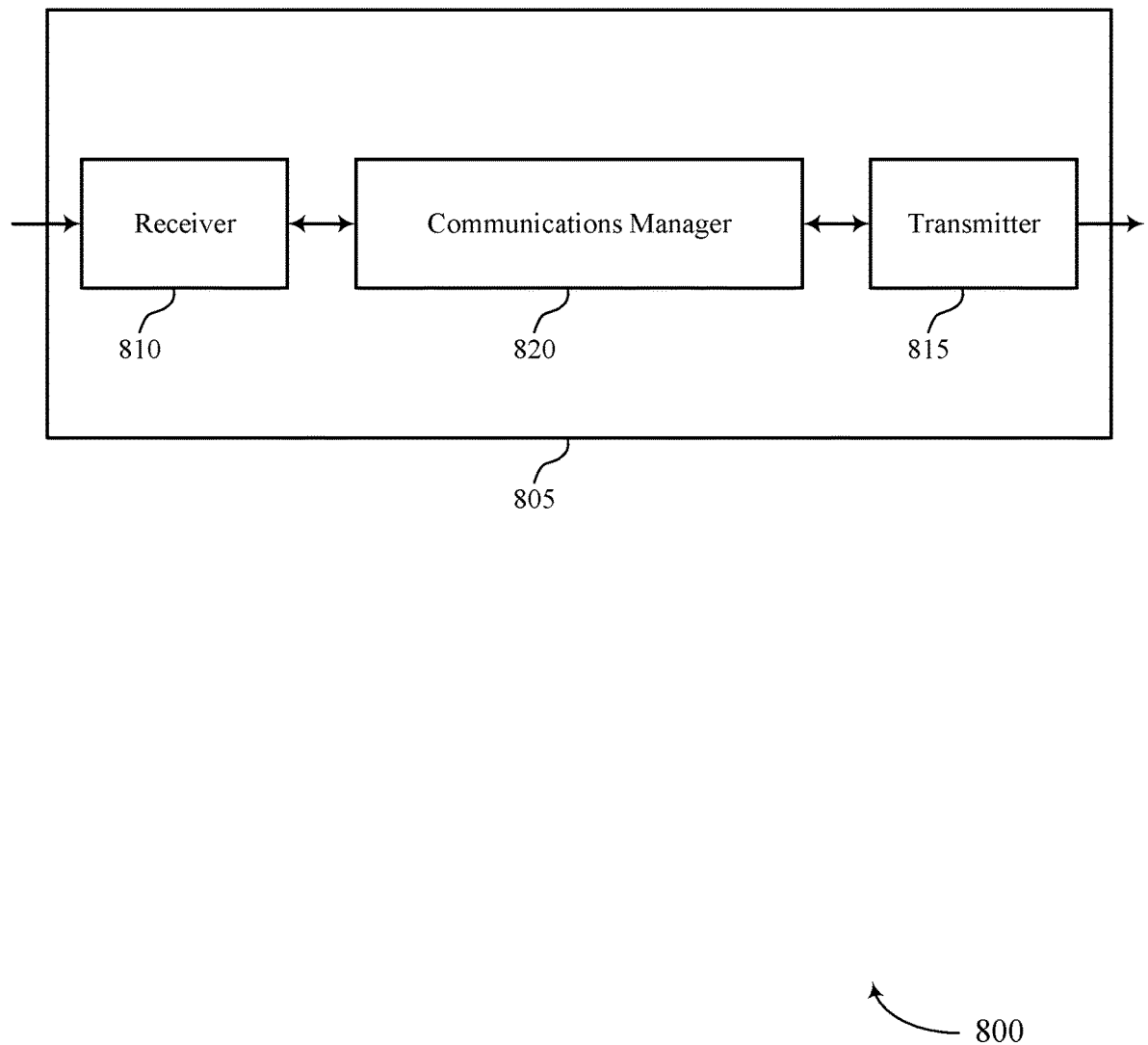
FIGS. 8 and 9 show block diagrams of devices that support IAB sidelink function control in accordance with aspects of the present disclosure.

FIG. 8 shows a block diagram 800 of a device 805 that supports IAB sidelink function control in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to IAB sidelink function control). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to IAB sidelink function control). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of IAB sidelink function control as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. For example, the communications manager 820 may be configured as or otherwise support a means for receiving, from a DU of an IAB node performing sidelink communications with the UE, a configuration of sidelink parameters for sidelink communications with the DU. The communications manager 820 may be configured as or otherwise support a means for identifying a selected DU, the selected DU selected by a CU to control sidelink communications for the UE. The communications manager 820 may be configured as or otherwise support a means for performing sidelink communications based on the selected DU.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for improving control of sidelink communications by selecting a DU that may be the DU of the IAB node serving the sidelink UE or a parent DU of the IAB node.

Figure 9:
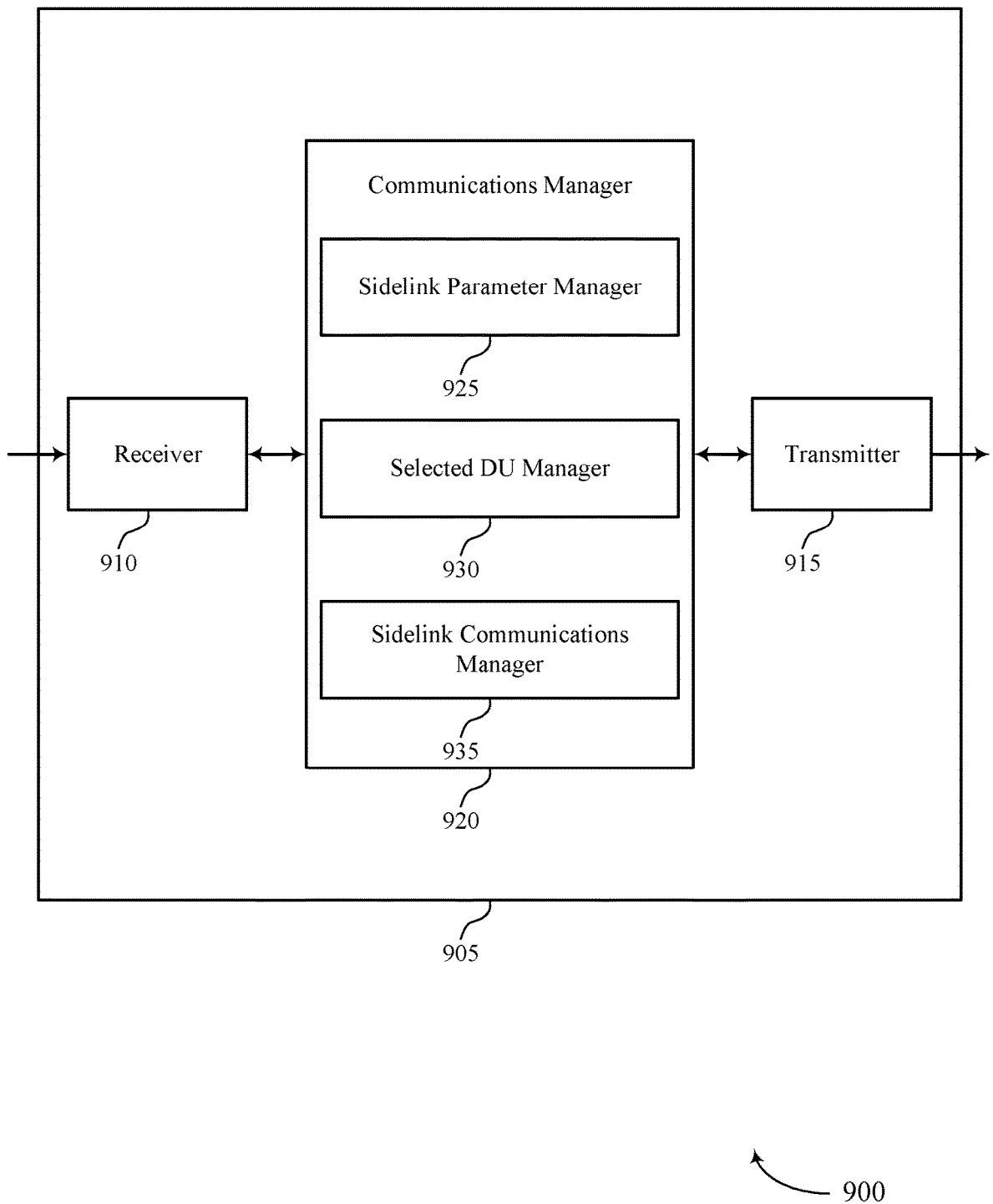

FIG. 9 shows a block diagram 900 of a device 905 that supports IAB sidelink function control in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to IAB sidelink function control). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to IAB sidelink function control). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of IAB sidelink function control as described herein. For example, the communications manager 920 may include a sidelink parameter manager 925, a selected DU manager 930, a sidelink communications manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. The sidelink parameter manager 925 may be configured as or otherwise support a means for receiving, from a DU of an IAB node performing sidelink communications with the UE, a configuration of sidelink parameters for sidelink communications with the DU. The selected DU manager 930 may be configured as or otherwise support a means for identifying a selected DU, the selected DU selected by a CU to control sidelink communications for the UE. The sidelink communications manager 935 may be configured as or otherwise support a means for performing sidelink communications based on the selected DU.

Figure 10:
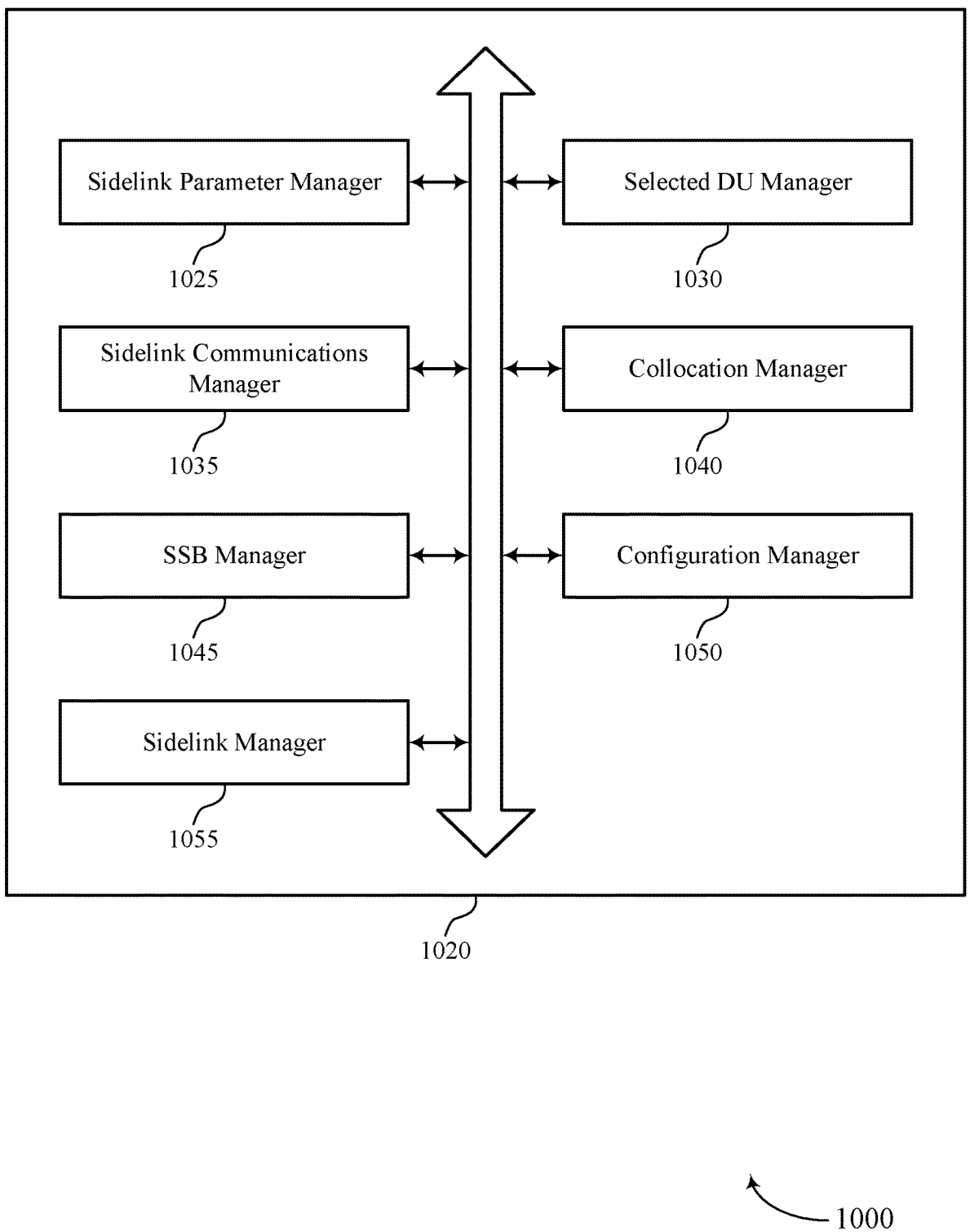
FIG. 10 shows a block diagram of a communications manager that supports IAB sidelink function control in accordance with aspects of the present disclosure.

FIG. 10 shows a block diagram 1000 of a communications manager 1020 that supports IAB sidelink function control in accordance with aspects of the present disclosure. The communications manager 1020 may be an example of aspects of a communications manager 820, a communications manager 920, or both, as described herein. The communications manager 1020, or various components thereof, may be an example of means for performing various aspects of IAB sidelink function control as described herein. For example, the communications manager 1020 may include a sidelink parameter manager 1025, a selected DU manager 1030, a sidelink communications manager 1035, a collocation manager 1040, an SSB manager 1045, a configuration manager 1050, a sidelink manager 1055, or any combination thereof. Each of these components may communicate, directly or indirectly, with one another (e.g., via one or more buses).

The communications manager 1020 may support wireless communication at a UE in accordance with examples as disclosed herein. The sidelink parameter manager 1025 may be configured as or otherwise support a means for receiving, from a DU of an IAB node performing sidelink communications with the UE, a configuration of sidelink parameters for sidelink communications with the DU. The selected DU manager 1030 may be configured as or otherwise support a means for identifying a selected DU, the selected DU selected by a CU to control sidelink communications for the UE. The sidelink communications manager 1035 may be configured as or otherwise support a means for performing sidelink communications based on the selected DU.

In some examples, the collocation manager 1040 may be configured as or otherwise support a means for determining that the selected DU and the DU performing sidelink communications with the UE are collocated within the IAB node, where the selected DU is based on the collocation.

In some examples, the SSB manager 1045 may be configured as or otherwise support a means for determining that a first synchronization signal transmitted from the selected DU is quasi-collocated with respect to a second synchronization signal transmitted from the DU performing sidelink communications with the UE, where the selected DU is based on the quasi-collocated first synchronization signal and second synchronization signal.

In some examples, the configuration manager 1050 may be configured as or otherwise support a means for exchanging one or more configuration messages with the selected DU, the parent DU of the DU performing sidelink communications with the UE, or both, where the configuration of sidelink parameters is based on the exchanging.

In some examples, the sidelink manager 1055 may be configured as or otherwise support a means for identifying a type of sidelink communications, a set of sidelink resources associated with the sidelink communications, or both, where the selected DU is based on the identifying. In some examples, the indication is received via an RRC message, an F1 interface message, MAC CE message, a DCI message, a SCI message, or combinations thereof. In some examples, the configuration of sidelink parameters includes an indication that the UE is to perform timing synchronization with the selected DU for the sidelink communications and/or that the UE is to receive sidelink grants from the selected DU for the sidelink communications. In some examples, the indication is received directly from the DU performing sidelink communications with the UE or relayed via one or more parent DUs of the DU performing sidelink communications with the UE.

Figure 11:
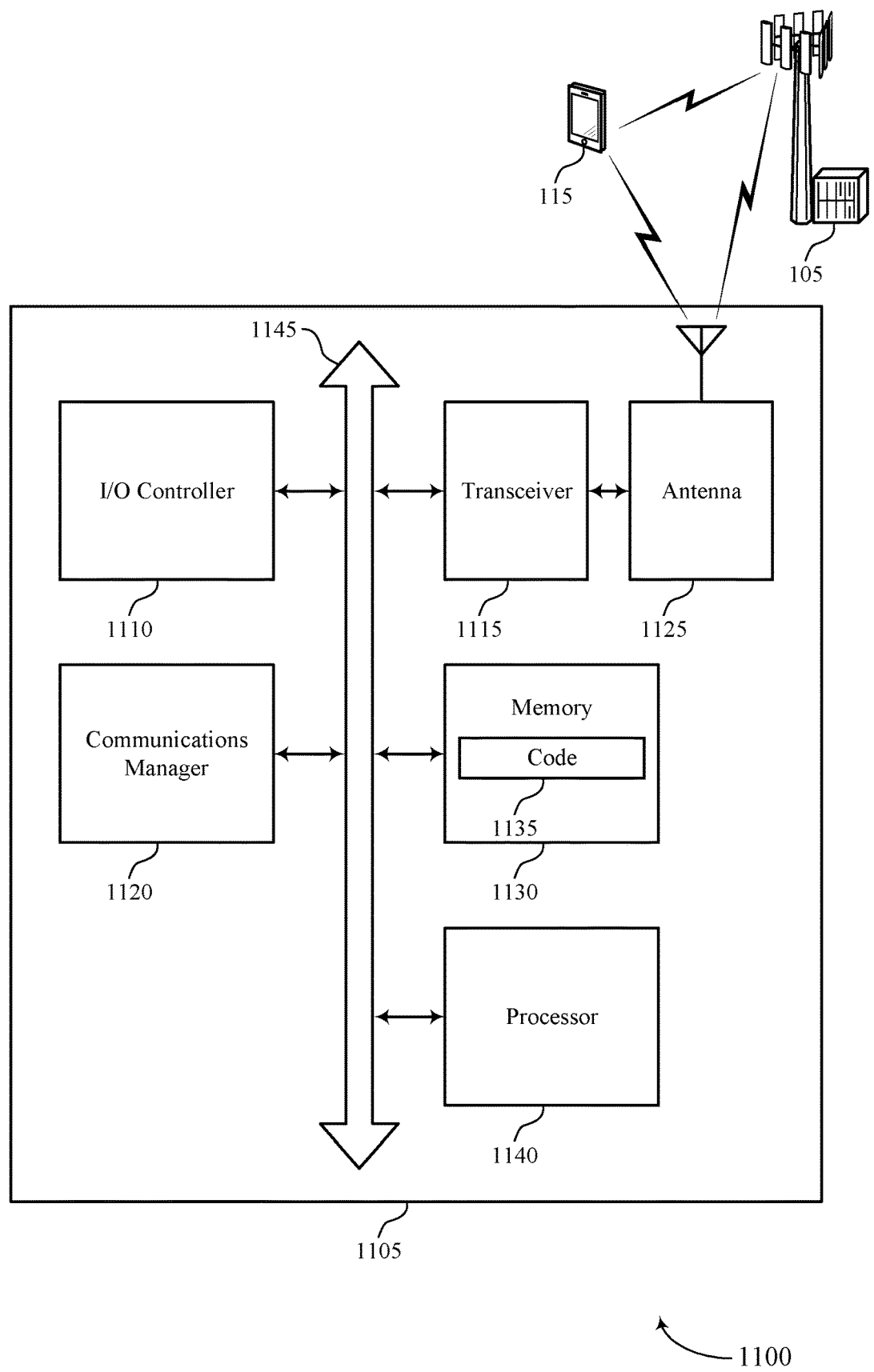
FIG. 11 shows a diagram of a system including a device that supports IAB sidelink function control in accordance with aspects of the present disclosure.

FIG. 11 shows a diagram of a system 1100 including a device 1105 that supports IAB sidelink function control in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting IAB sidelink function control). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving, from a DU of an IAB node performing sidelink communications with the UE, a configuration of sidelink parameters for sidelink communications with the DU. The communications manager 1120 may be configured as or otherwise support a means for identifying a selected DU, the selected DU selected by a CU to control sidelink communications for the UE. The communications manager 1120 may be configured as or otherwise support a means for performing sidelink communications based on the selected DU.

By including or configuring the communications manager 1120 in accordance with examples as described herein, the device 1105 may support techniques for improving control of sidelink communications by selecting a DU that may be the DU of the IAB node serving the sidelink UE or a parent DU of the IAB node.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of IAB sidelink function control as described herein, or the processor 1140 and the memory 1130 may be otherwise configured to perform or support such operations.

Figure 12:
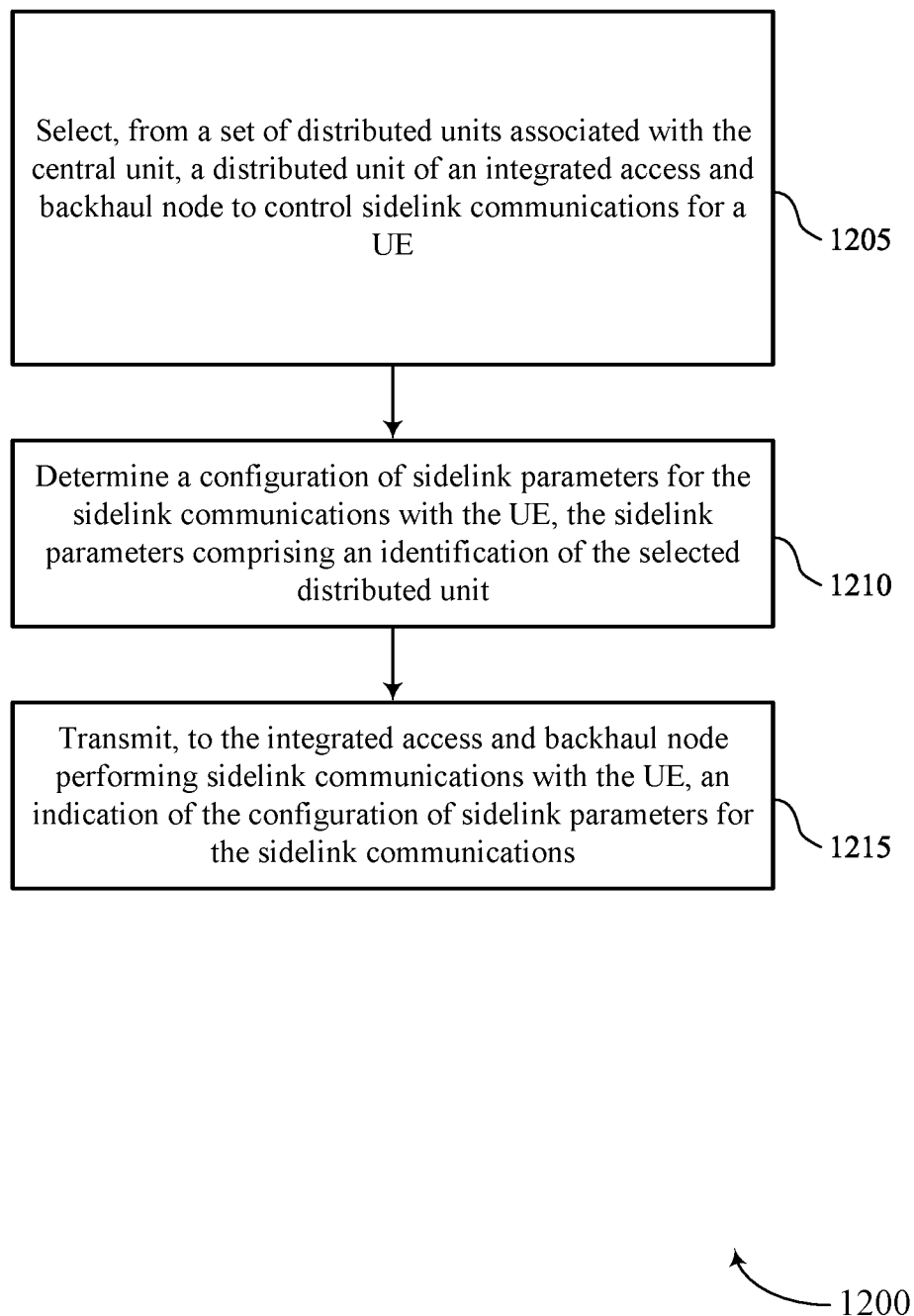
FIGS. 12 through 16 show flowcharts illustrating methods that support IAB sidelink function control in accordance with aspects of the present disclosure.

FIG. 12 shows a flowchart illustrating a method 1200 that supports IAB sidelink function control in accordance with aspects of the present disclosure. The operations of the method 1200 may be implemented by a base station or its components as described herein. For example, the operations of the method 1200 may be performed by a base station 105 as described with reference to FIGS. 1 through 7. In some examples, a base station may execute a set of instructions to control the functional elements of the base station to perform the described functions. Additionally, or alternatively, the base station may perform aspects of the described functions using special-purpose hardware.

At 1205, the method may include selecting, from a set of DUs associated with the CU, a DU of an IAB node to control sidelink communications for a UE. The operations of 1205 may be performed in accordance with examples as disclosed herein. In some examples, aspects of the operations of 1205 may be performed by a CU manager 625 as described with reference to FIG. 6.

At 1210, the method may include determining a configuration of sidelink parameters for the sidelink communications with the UE, the sidelink parameters including an identification of the selected DU. The operations of 1210 may be performed in accordance with examples as disclosed herein. In some examples, aspects of the operations of 1210 may be performed by a CU manager 625 as described with reference to FIG. 6.

At 1215, the method may include transmitting, to the TAB node performing sidelink communications with the UE, an indication of the configuration of sidelink parameters for the sidelink communications. The operations of 1215 may be performed in accordance with examples as disclosed herein. In some examples, aspects of the operations of 1215 may be performed by a CU manager 625 as described with reference to FIG. 6.

Figure 13:
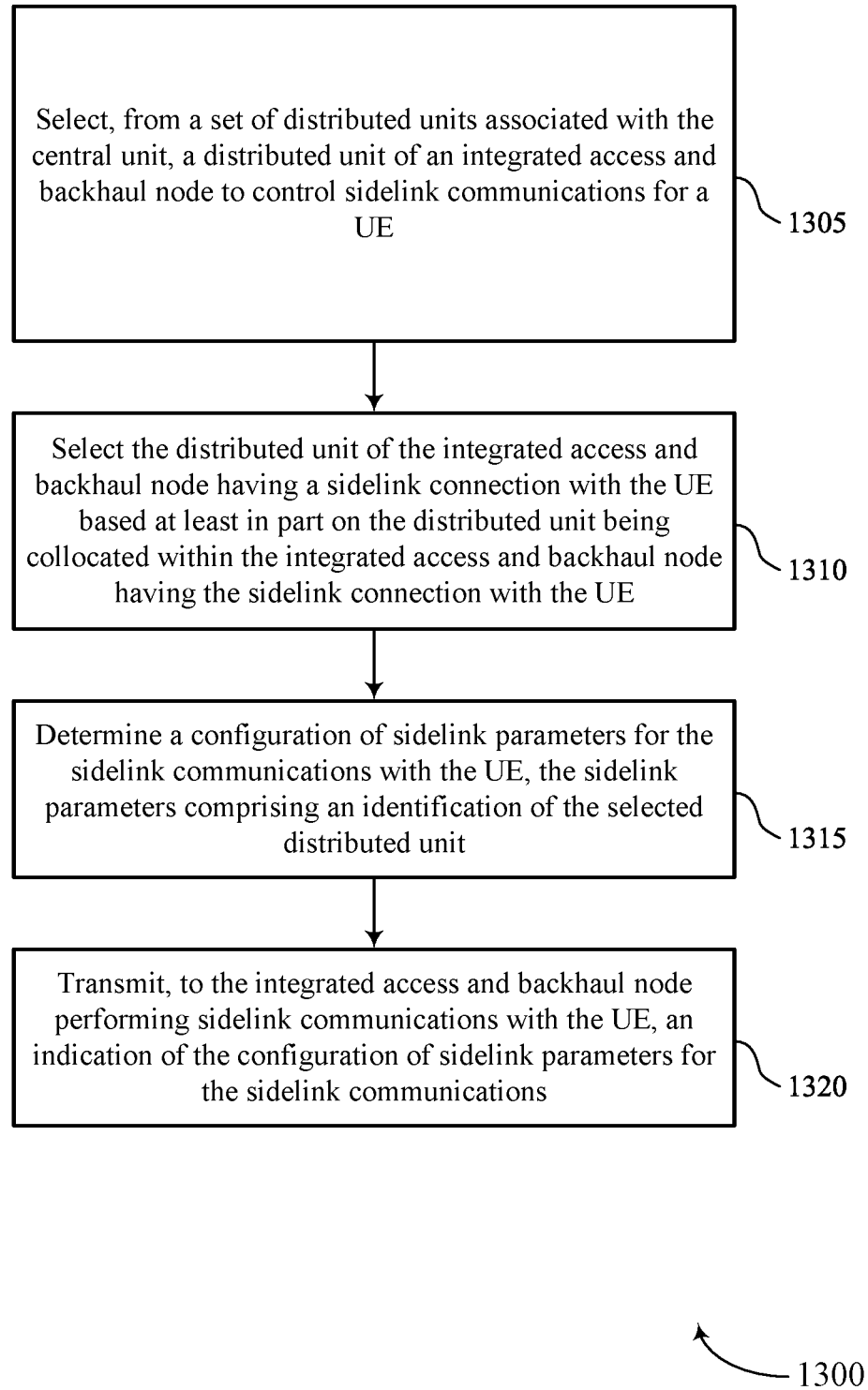

FIG. 13 shows a flowchart illustrating a method 1300 that supports TAB sidelink function control in accordance with aspects of the present disclosure. The operations of the method 1300 may be implemented by a base station or its components as described herein. For example, the operations of the method 1300 may be performed by a base station 105 as described with reference to FIGS. 1 through 7. In some examples, a base station may execute a set of instructions to control the functional elements of the base station to perform the described functions. Additionally, or alternatively, the base station may perform aspects of the described functions using special-purpose hardware.

At 1305, the method may include selecting, from a set of DUs associated with the CU, a DU of an IAB node to control sidelink communications for a UE. The operations of 1305 may be performed in accordance with examples as disclosed herein. In some examples, aspects of the operations of 1305 may be performed by a CU manager 625 as described with reference to FIG. 6.

At 1310, the method may include selecting the DU of the TAB node having a sidelink connection with the UE based on the DU being collocated within the TAB node having the sidelink connection with the UE. The operations of 1310 may be performed in accordance with examples as disclosed herein. In some examples, aspects of the operations of 1310 may be performed by a collocation manager 635 as described with reference to FIG. 6.

At 1315, the method may include determining a configuration of sidelink parameters for the sidelink communications with the UE, the sidelink parameters including an identification of the selected DU. The operations of 1315 may be performed in accordance with examples as disclosed herein. In some examples, aspects of the operations of 1315 may be performed by a CU manager 625 as described with reference to FIG. 6.

At 1320, the method may include transmitting, to the IAB node performing sidelink communications with the UE, an indication of the configuration of sidelink parameters for the sidelink communications. The operations of 1320 may be performed in accordance with examples as disclosed herein. In some examples, aspects of the operations of 1320 may be performed by a CU manager 625 as described with reference to FIG. 6.

Figure 14:
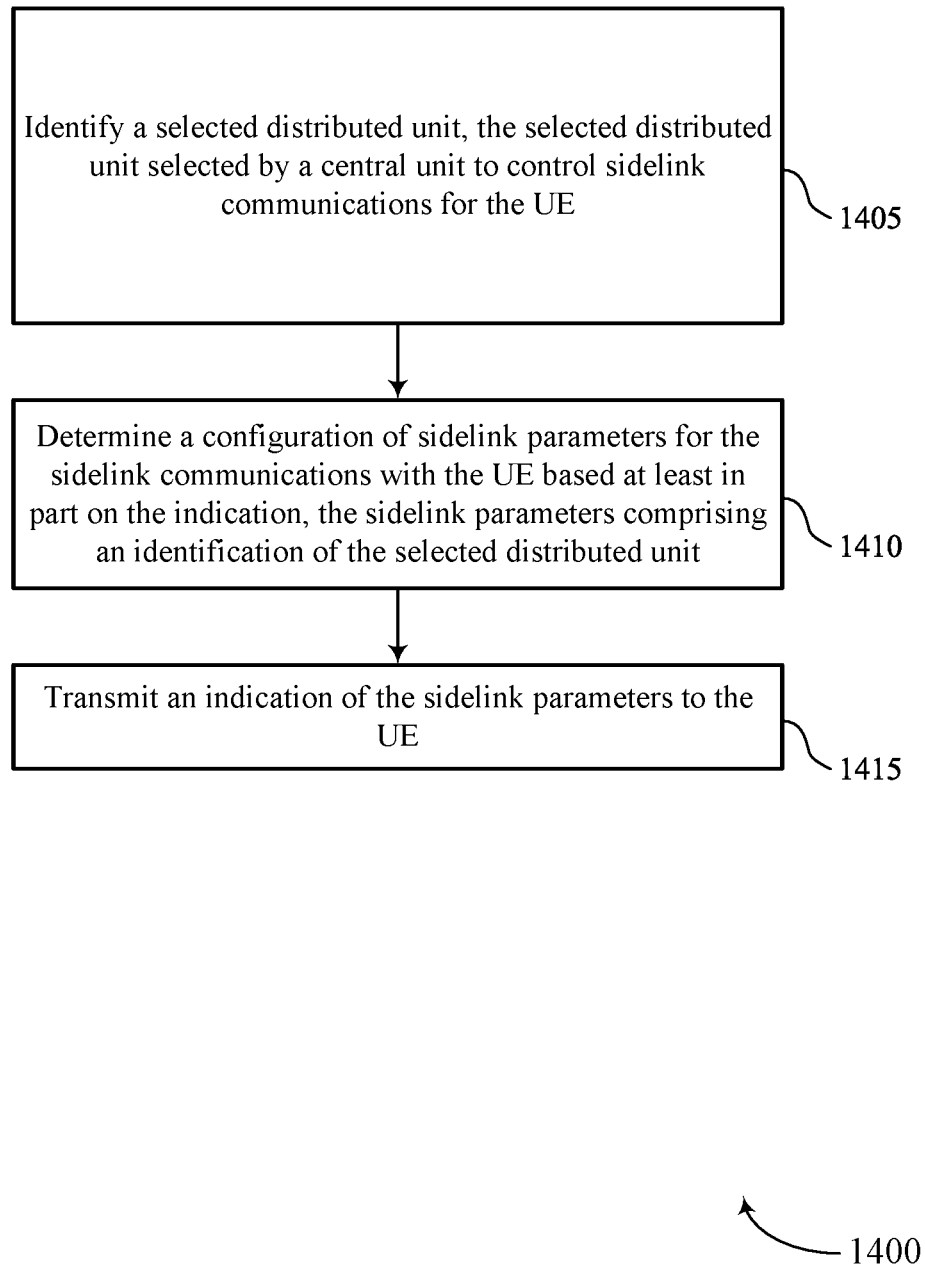

FIG. 14 shows a flowchart illustrating a method 1400 that supports IAB sidelink function control in accordance with aspects of the present disclosure. The operations of the method 1400 may be implemented by a base station or its components as described herein. For example, the operations of the method 1400 may be performed by a base station 105 as described with reference to FIGS. 1 through 7. In some examples, a base station may execute a set of instructions to control the functional elements of the base station to perform the described functions. Additionally, or alternatively, the base station may perform aspects of the described functions using special-purpose hardware.

At 1405, the method may include identifying a selected DU, the selected DU selected by a CU to control sidelink communications for the UE. The operations of 1405 may be performed in accordance with examples as disclosed herein. In some examples, aspects of the operations of 1405 may be performed by a DU manager 630 as described with reference to FIG. 6.

At 1410, the method may include determining a configuration of sidelink parameters for the sidelink communications with the UE based on the indication, the sidelink parameters including an identification of the selected DU. The operations of 1410 may be performed in accordance with examples as disclosed herein. In some examples, aspects of the operations of 1410 may be performed by a DU manager 630 as described with reference to FIG. 6.

At 1415, the method may include transmitting an indication of the sidelink parameters to the UE. The operations of 1415 may be performed in accordance with examples as disclosed herein. In some examples, aspects of the operations of 1415 may be performed by a DU manager 630 as described with reference to FIG. 6.

Figure 15:
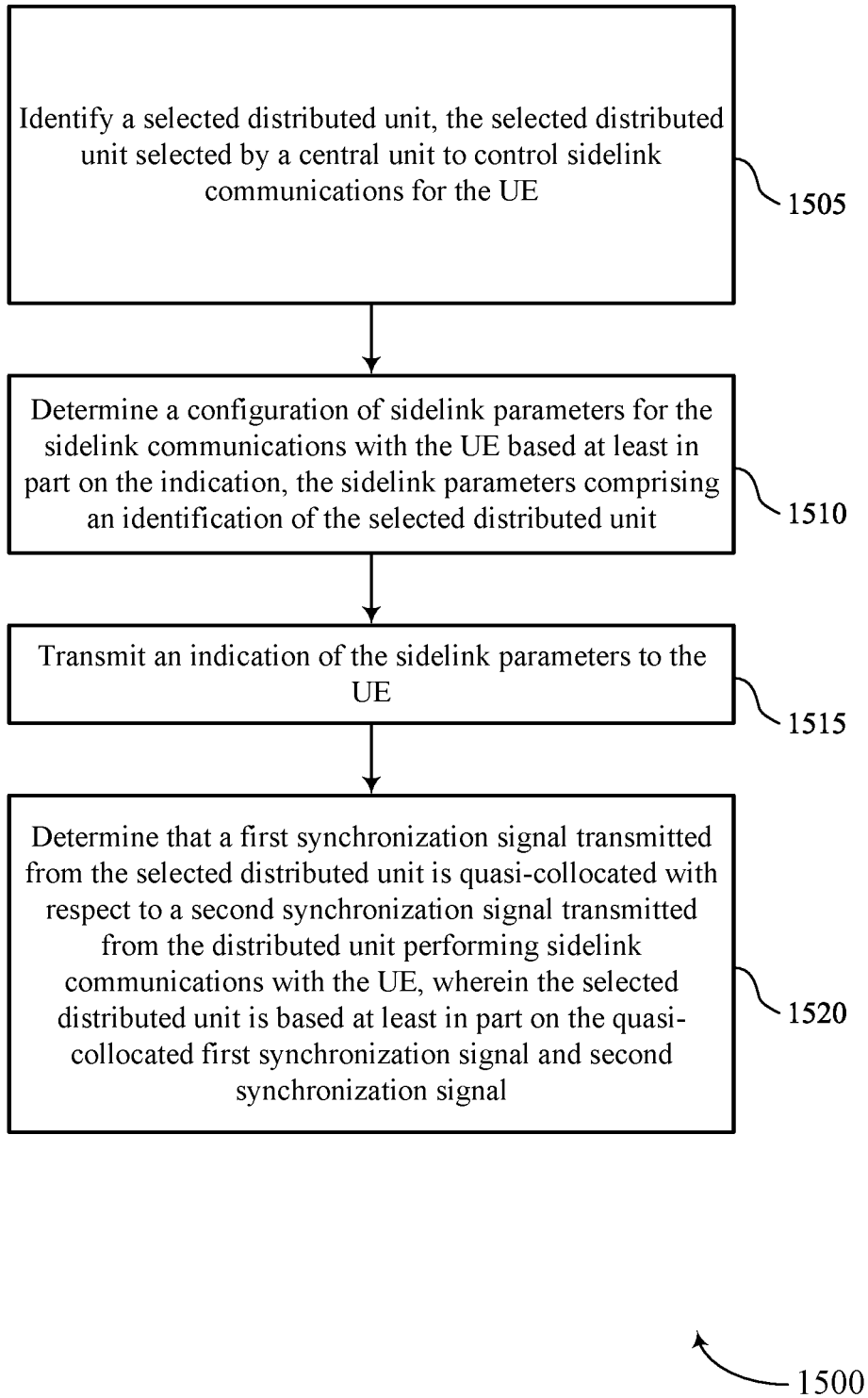

FIG. 15 shows a flowchart illustrating a method 1500 that supports IAB sidelink function control in accordance with aspects of the present disclosure. The operations of the method 1500 may be implemented by a base station or its components as described herein. For example, the operations of the method 1500 may be performed by a base station 105 as described with reference to FIGS. 1 through 7. In some examples, a base station may execute a set of instructions to control the functional elements of the base station to perform the described functions. Additionally, or alternatively, the base station may perform aspects of the described functions using special-purpose hardware.

At 1505, the method may include identifying a selected DU, the selected DU selected by a CU to control sidelink communications for the UE. The operations of 1505 may be performed in accordance with examples as disclosed herein. In some examples, aspects of the operations of 1505 may be performed by a DU manager 630 as described with reference to FIG. 6.

At 1510, the method may include determining a configuration of sidelink parameters for the sidelink communications with the UE based on the indication, the sidelink parameters including an identification of the selected DU. The operations of 1510 may be performed in accordance with examples as disclosed herein. In some examples, aspects of the operations of 1510 may be performed by a DU manager 630 as described with reference to FIG. 6.

At 1515, the method may include transmitting an indication of the sidelink parameters to the UE. The operations of 1515 may be performed in accordance with examples as disclosed herein. In some examples, aspects of the operations of 1515 may be performed by a DU manager 630 as described with reference to FIG. 6.

At 1520, the method may include determining that a first synchronization signal transmitted from the selected DU is quasi-collocated with respect to a second synchronization signal transmitted from the DU performing sidelink communications with the UE, where the selected DU is based on the quasi-collocated first synchronization signal and second synchronization signal. The operations of 1520 may be performed in accordance with examples as disclosed herein. In some examples, aspects of the operations of 1520 may be performed by an SSB manager 640 as described with reference to FIG. 6.

Figure 16:
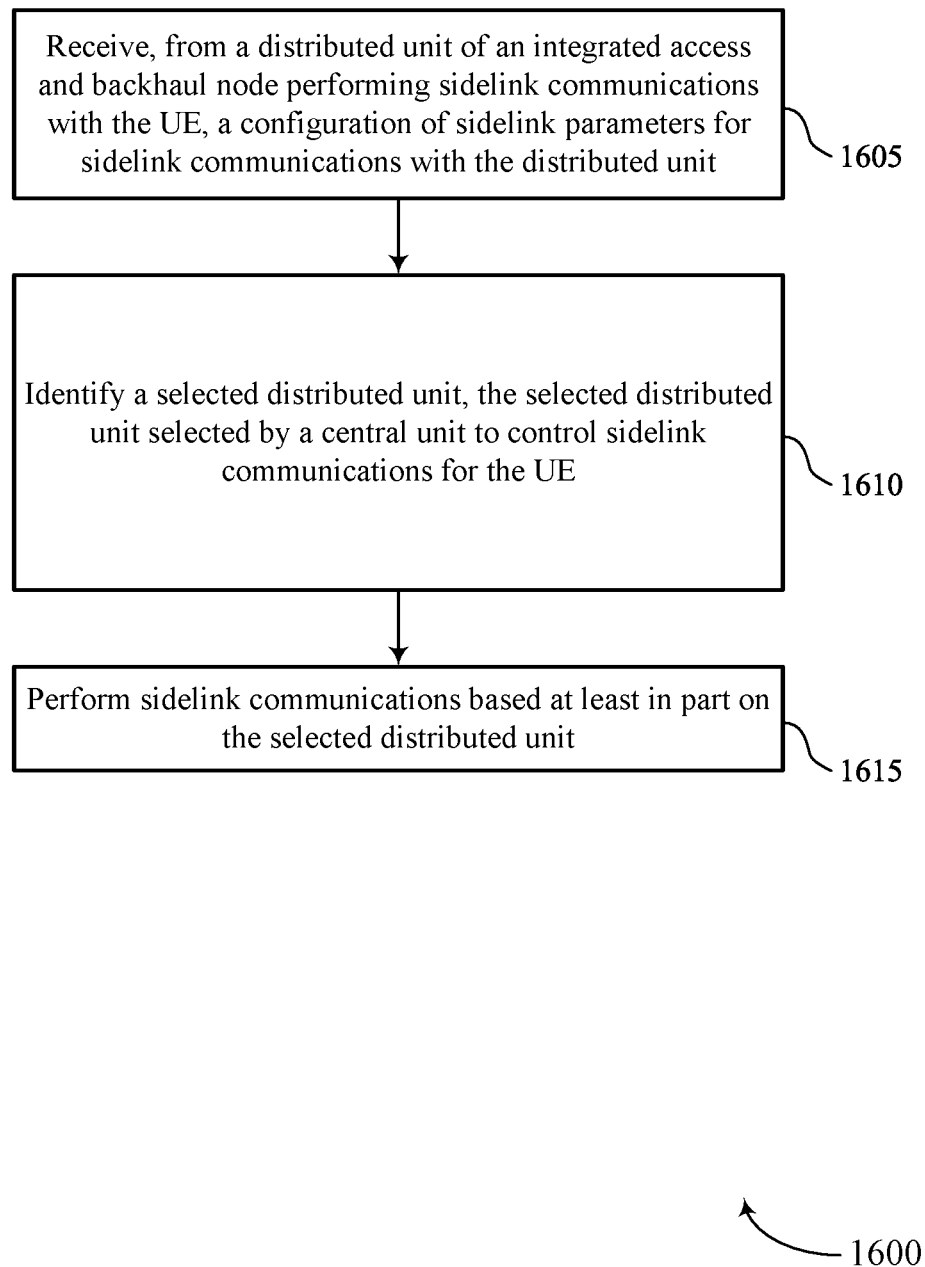

FIG. 16 shows a flowchart illustrating a method 1600 that supports IAB sidelink function control in accordance with aspects of the present disclosure. The operations of the method 1600 may be implemented by a UE or its components as described herein. For example, the operations of the method 1600 may be performed by a UE 115 as described with reference to FIGS. 1 through 3 and 8 through 11. In some examples, a UE may execute a set of instructions to control the functional elements of the UE to perform the described functions. Additionally, or alternatively, the UE may perform aspects of the described functions using special-purpose hardware.

At 1605, the method may include receiving, from a DU of an IAB node performing sidelink communications with the UE, a configuration of sidelink parameters for sidelink communications with the DU. The operations of 1605 may be performed in accordance with examples as disclosed herein. In some examples, aspects of the operations of 1605 may be performed by a sidelink parameter manager 1025 as described with reference to FIG. 10.

At 1610, the method may include identifying a selected DU, the selected DU selected by a CU to control sidelink communications for the UE. The operations of 1610 may be performed in accordance with examples as disclosed herein. In some examples, aspects of the operations of 1610 may be performed by a selected DU manager 1030 as described with reference to FIG. 10.

At 1615, the method may include performing sidelink communications based on the selected DU. The operations of 1615 may be performed in accordance with examples as disclosed herein. In some examples, aspects of the operations of 1615 may be performed by a sidelink communications manager 1035 as described with reference to FIG. 10.

The following provides an overview of aspects of the present disclosure:

Aspect 1: A method for wireless communication at a CU, comprising: selecting, from a set of DUs associated with the CU, a DU of an IAB node to control sidelink communications for a UE; determining a configuration of sidelink parameters for the sidelink communications with the UE, the sidelink parameters comprising an identification of the selected DU; and transmitting, to the IAB node performing sidelink communications with the UE, an indication of the configuration of sidelink parameters for the sidelink communications.

Aspect 2: The method of aspect 1, wherein selecting the DU comprises: selecting the DU of the IAB node having a sidelink connection with the UE based at least in part on the DU being collocated within the IAB node having the sidelink connection with the UE.

Aspect 3: The method of any of aspects 1 through 2, further comprising: determining that a first synchronization signal transmitted from the selected DU is QCL with respect to a second synchronization signal transmitted from the DU performing sidelink communications with the UE, wherein the selecting is based at least in part on the QCL first synchronization signal and second synchronization signal.

Aspect 4: The method of any of aspects 1 through 3, further comprising: exchanging one or more configuration messages with the DU performing sidelink communications with the UE, the parent DU of the DU performing sidelink communications with the UE, or both, wherein the configuration of sidelink parameters is based at least in part on the exchanging.

Aspect 5: The method of any of aspects 1 through 4, further comprising: identifying a type of sidelink communications, a set of sidelink resources associated with the sidelink communications, or both, wherein the selecting is based at least in part on the identifying.

Aspect 6: The method of any of aspects 1 through 5, wherein the indication is transmitted via an RRC message, an F1 interface message, MAC CE message, a DCI message, a SCI message, or a combination thereof.

Aspect 7: The method of any of aspects 1 through 6, wherein the configuration of sidelink parameters comprises an indication that the UE is to perform timing synchronization with the selected DU for the sidelink communications, an indication that the UE is to receive sidelink grants from the selected DU for the sidelink communications, or both.

Aspect 8: The method of any of aspects 1 through 7, wherein the indication is transmitted directly to the DU performing sidelink communications with the UE or relayed via one or more parent DUs of the DU performing sidelink communications with the UE.

Aspect 9: The method of any of aspects 1 through 8, wherein the selected DU comprising the DU of the IAB node having a sidelink connection with the UE or a parent DU of the IAB node.

Aspect 10: A method for wireless communication at a DU of an IAB node performing sidelink communications with a UE, comprising: identifying a selected DU, the selected DU selected by a CU to control sidelink communications for the UE; determining a configuration of sidelink parameters for the sidelink communications with the UE based at least in part on the indication, the sidelink parameters comprising an identification of the selected DU; and transmitting an indication of the sidelink parameters to the UE.

Aspect 11: The method of aspect 10, further comprising: determining that the selected DU and the DU performing sidelink communications with the UE are collocated within the IAB node, wherein the selected DU is based at least in part on the collocation.

Aspect 12: The method of any of aspects 10 through 11, further comprising: determining that a first synchronization signal transmitted from the selected DU is QCL with respect to a second synchronization signal transmitted from the DU performing sidelink communications with the UE, wherein the selected DU is based at least in part on the QCL first synchronization signal and second synchronization signal.

Aspect 13: The method of any of aspects 10 through 12, further comprising: exchanging one or more configuration messages with the selected DU, the parent DU of the DU performing sidelink communications with the UE, or both, wherein the configuration of sidelink parameters is based at least in part on the exchanging.

Aspect 14: The method of any of aspects 10 through 13, further comprising: identifying a type of sidelink communications, a set of sidelink resources associated with the sidelink communications, or both, wherein the selected DU is based at least in part on the identifying.

Aspect 15: The method of any of aspects 10 through 14, wherein the indication is received via an RRC message, an F1 interface message, MAC CE message, a DCI message, a SCI message, or a combination thereof.

Aspect 16: The method of any of aspects 10 through 15, wherein the configuration of sidelink parameters comprises an indication that the UE is to perform timing synchronization with the selected DU for the sidelink communications, an indication that the UE is to receive sidelink grants from the selected DU for the sidelink communications, or both.

Aspect 17: The method of any of aspects 10 through 16, wherein the indication is received directly to the DU performing sidelink communications with the UE or relayed via one or more parent DUs of the DU performing sidelink communications with the UE.

Aspect 18: The method of any of aspects 10 through 17, wherein the selected DU comprising the DU of the IAB node performing sidelink communications with the UE or a parent DU of the IAB node.

Aspect 19: A method for wireless communication at a UE, comprising: receiving, from a DU of an IAB node performing sidelink communications with the UE, a configuration of sidelink parameters for sidelink communications with the DU; identifying a selected DU, the selected DU selected by a CU to control sidelink communications for the UE; and performing sidelink communications based at least in part on the selected DU.

Aspect 20: The method of aspect 19, further comprising: determining that a first synchronization signal transmitted from the selected DU is QCL with respect to a second synchronization signal transmitted from the DU performing sidelink communications with the UE, wherein the selected DU is based at least in part on the QCL first synchronization signal and second synchronization signal.

Aspect 21: The method of any of aspects 19 through 20, further comprising: exchanging one or more configuration messages with the selected DU, the parent DU of the DU performing sidelink communications with the UE, or both, wherein the configuration of sidelink parameters is based at least in part on the exchanging.

Aspect 22: The method of any of aspects 19 through 21, further comprising: identifying a type of sidelink communications, a set of sidelink resources associated with the sidelink communications, or both, wherein the selected DU is based at least in part on the identifying.

Aspect 23: The method of any of aspects 19 through 22, wherein the indication is received via an RRC message, an F1 interface message, MAC CE message, a DCI message, a SCI message, or combinations thereof.

Aspect 24: The method of any of aspects 19 through 23, wherein the configuration of sidelink parameters comprises an indication that the UE is to perform timing synchronization with the selected DU for the sidelink communications, an indication that the UE is to receive sidelink grants from the selected DU for the sidelink communications, or both.

Aspect 25: The method of any of aspects 19 through 24, wherein the indication is received directly from the DU performing sidelink communications with the UE or relayed via one or more parent DUs of the DU performing sidelink communications with the UE.

Aspect 26: An apparatus for wireless communication at a CU, comprising a processor; memory coupled with the processor; and instructions stored in the memory and executable by the processor to cause the apparatus to perform a method of any of aspects 1 through 9.

Aspect 27: An apparatus for wireless communication at a CU, comprising at least one means for performing a method of any of aspects 1 through 9.

Aspect 28: A non-transitory computer-readable medium storing code for wireless communication at a CU, the code comprising instructions executable by a processor to perform a method of any of aspects 1 through 9.

Aspect 29: An apparatus for wireless communication at a DU of an IAB node performing sidelink communications with a UE, comprising a processor; memory coupled with the processor; and instructions stored in the memory and executable by the processor to cause the apparatus to perform a method of any of aspects 10 through 18.

Aspect 30: An apparatus for wireless communication at a DU of an IAB node performing sidelink communications with a UE, comprising at least one means for performing a method of any of aspects 10 through 18.

Aspect 31: A non-transitory computer-readable medium storing code for wireless communication at a DU of an IAB node performing sidelink communications with a UE, the code comprising instructions executable by a processor to perform a method of any of aspects 10 through 18.

Aspect 32: An apparatus for wireless communication at a UE, comprising a processor; memory coupled with the processor; and instructions stored in the memory and executable by the processor to cause the apparatus to perform a method of any of aspects 19 through 25.

Aspect 33: An apparatus for wireless communication at a UE, comprising at least one means for performing a method of any of aspects 19 through 25.

Aspect 34: A non-transitory computer-readable medium storing code for wireless communication at a UE, the code comprising instructions executable by a processor to perform a method of any of aspects 19 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a central unit, comprising:
   selecting, from a set of distributed units associated with the central unit, a distributed unit of an integrated access and backhaul node having a sidelink connection with a user equipment (UE) to control sidelink communications with the UE based at least in part on the distributed unit being collocated within the integrated access and backhaul node having the sidelink connection with the UE or on a first synchronization signal transmitted from the selected distributed unit being quasi-collocated with respect to a second synchronization signal transmitted from the distributed unit performing sidelink communications with the UE;
   determining a configuration of sidelink parameters for the sidelink communications with the UE, the sidelink parameters comprising an identification of the selected distributed unit; and
   transmitting, to the integrated access and backhaul node performing sidelink communications with the UE, an indication of the configuration of sidelink parameters for the sidelink communications.

2. The method of claim 1, wherein selecting the distributed unit comprises:
   selecting the distributed unit of the integrated access and backhaul node having the sidelink connection with the UE based at least in part on the distributed unit being collocated within the integrated access and backhaul node having the sidelink connection with the UE.

3. The method of claim 1, further comprising:
   determining that the first synchronization signal transmitted from the selected distributed unit is quasi-collocated with respect to the second synchronization signal transmitted from the distributed unit performing sidelink communications with the UE, wherein the selecting is based at least in part on the quasi-collocated first synchronization signal and second synchronization signal.

4. The method of claim 1, further comprising:
   exchanging one or more configuration messages with the distributed unit performing sidelink communications with the UE, a parent distributed unit of the distributed unit performing sidelink communications with the UE, or both, wherein the configuration of sidelink parameters is based at least in part on the exchanging.

5. The method of claim 1, further comprising:
identifying a type of sidelink communications, a set of sidelink resources associated with the sidelink communications, or both, wherein the selecting is based at least in part on the identifying.

6. The method of claim 1, wherein the indication is transmitted via a radio resource control (RRC) message, an F1 interface message, medium access control (MAC) control element (CE) message, a downlink control information (DCI) message, a sidelink control information (SCI) message, or a combination thereof.

7. The method of claim 1, wherein the configuration of sidelink parameters comprises an indication that the UE is to perform timing synchronization with the selected distributed unit for the sidelink communications, an indication that the UE is to receive sidelink grants from the selected distributed unit for the sidelink communications, or both.

8. The method of claim 1, wherein the indication is transmitted directly to the distributed unit performing sidelink communications with the UE or relayed via one or more parent distributed units of the distributed unit performing sidelink communications with the UE.

9. A method for wireless communication at a distributed unit of an integrated access and backhaul node performing sidelink communications with a user equipment (UE), comprising:
identifying a selected distributed unit, the selected distributed unit selected by a central unit to control sidelink communications for the UE based at least in part on the selected distributed unit and the distributed unit performing the sidelink communications with the UE being collocated within the integrated access and backhaul node or on a first synchronization signal transmitted from the selected distributed unit being quasi-collocated with respect to a second synchronization signal transmitted from the distributed unit performing sidelink communications with the UE;
determining a configuration of sidelink parameters for the sidelink communications with the UE based at least in part on the identifying, the sidelink parameters comprising an identification of the selected distributed unit; and
transmitting an indication of the sidelink parameters to the UE.

10. The method of claim 9, further comprising:
determining that the selected distributed unit and the distributed unit performing sidelink communications with the UE are collocated within the integrated access and backhaul node, wherein the selected distributed unit is based at least in part on the collocation.

11. The method of claim 9, further comprising:
determining that the first synchronization signal transmitted from the selected distributed unit is quasi-collocated with respect to the second synchronization signal transmitted from the distributed unit performing sidelink communications with the UE, wherein the selected distributed unit is based at least in part on the quasi-collocated first synchronization signal and second synchronization signal.

12. The method of claim 9, further comprising:
exchanging one or more configuration messages with the selected distributed unit, a parent distributed unit of the distributed unit performing sidelink communications with the UE, or both, wherein the configuration of sidelink parameters is based at least in part on the exchanging.

13. The method of claim 9, further comprising:
identifying a type of sidelink communications, a set of sidelink resources associated with the sidelink communications, or both, wherein the selected distributed unit is based at least in part on the identifying.

14. The method of claim 9, wherein the indication is received via a radio resource control (RRC) message, an F1 interface message, medium access control (MAC) control element (CE) message, a downlink control information (DCI) message, a sidelink control information (SCI) message, or a combination thereof.

15. The method of claim 9, wherein the configuration of sidelink parameters comprises an indication that the UE is to perform timing synchronization with the selected distributed unit for the sidelink communications, an indication that the UE is to receive sidelink grants from the selected distributed unit for the sidelink communications, or both.

16. The method of claim 9, wherein the indication is received directly to the distributed unit performing sidelink communications with the UE or relayed via one or more parent distributed units of the distributed unit performing sidelink communications with the UE.

17. A method for wireless communication at a user equipment (UE), comprising:
receiving, from a distributed unit of an integrated access and backhaul node performing sidelink communications with the UE, a configuration of sidelink parameters for sidelink communications with the distributed unit;
identifying a selected distributed unit, the selected distributed unit selected by a central unit to control sidelink communications for the UE based at least in part on the selected distributed unit and the distributed unit performing the sidelink communications with the UE being collocated within the integrated access and backhaul node or on a first synchronization signal transmitted from the selected distributed unit being quasi-collocated with respect to a second synchronization signal transmitted from the distributed unit performing sidelink communications with the UE; and
performing sidelink communications based at least in part on the selected distributed unit.

18. The method of claim 17, further comprising:
determining that the first synchronization signal transmitted from the selected distributed unit is quasi-collocated with respect to the second synchronization signal transmitted from the distributed unit performing sidelink communications with the UE, wherein the selected distributed unit is based at least in part on the quasi-collocated first synchronization signal and second synchronization signal.

19. The method of claim 17, further comprising:
exchanging one or more configuration messages with the selected distributed unit, a parent distributed unit of the distributed unit performing sidelink communications with the UE, or both, wherein the configuration of sidelink parameters is based at least in part on the exchanging.

20. The method of claim 17, further comprising:
identifying a type of sidelink communications, a set of sidelink resources associated with the sidelink communications, or both, wherein the selected distributed unit is based at least in part on the identifying.

21. The method of claim 17, wherein an indication of the configuration of sidelink parameters is received via a radio resource control (RRC) message, an F1 interface message, medium access control (MAC) control element (CE) message, a downlink control information (DCI) message, a sidelink control information (SCI) message, or combinations thereof.

22. The method of claim 17, wherein the configuration of sidelink parameters comprises an indication that the UE is to perform timing synchronization with the selected distributed unit for the sidelink communications, an indication that the UE is to receive sidelink grants from the selected distributed unit for the sidelink communications, or both.

23. The method of claim 17, wherein an indication of the configuration of sidelink parameters is received directly from the distributed unit performing sidelink communications with the UE or relayed via one or more parent distributed units of the distributed unit performing sidelink communications with the UE.

24. An apparatus for wireless communication at a central unit, comprising:
at least one processor;
at least one memory coupled with the at least one processor; and
instructions stored in the at least one memory and executable by the at least one processor to cause the apparatus to:
select, from a set of distributed units associated with the central unit, a distributed unit of an integrated access and backhaul node having a sidelink connection with a user equipment (UE) to control sidelink communications with the UE based at least in part on the distributed unit being collocated within the integrated access and backhaul node having the sidelink connection with the UE or on a first synchronization signal transmitted from the selected distributed unit being quasi-collocated with respect to a second synchronization signal transmitted from the distributed unit performing sidelink communications with the UE;
determine a configuration of sidelink parameters for the sidelink communications with the UE, the sidelink parameters comprising an identification of the selected distributed unit; and
transmit, to the integrated access and backhaul node performing sidelink communications with the UE, an indication of the configuration of sidelink parameters for the sidelink communications.

25. The apparatus of claim 24, wherein the instructions to select the distributed unit are executable by the at least one processor to cause the apparatus to:
select the distributed unit of the integrated access and backhaul node having the sidelink connection with the UE based at least in part on the distributed unit being collocated within the integrated access and backhaul node having the sidelink connection with the UE.

26. The apparatus of claim 24, wherein the instructions are further executable by the at least one processor to cause the apparatus to:
determine that the first synchronization signal transmitted from the selected distributed unit is quasi-collocated with respect to the second synchronization signal transmitted from the distributed unit performing sidelink communications with the UE, wherein the selecting is based at least in part on the quasi-collocated first synchronization signal and second synchronization signal.

27. The apparatus of claim 24, wherein the instructions are further executable by the at least one processor to cause the apparatus to:
exchange one or more configuration messages with the distributed unit performing sidelink communications with the UE, a parent distributed unit of the distributed unit performing sidelink communications with the UE, or both, wherein the configuration of sidelink parameters is based at least in part on the exchanging.

* * * * *